United States Patent
Lee et al.

(10) Patent No.: US 10,802,129 B2
(45) Date of Patent: Oct. 13, 2020

(54) DOPPLER MEASUREMENT METHOD IN WIRELESS LAN SYSTEM

(71) Applicant: LG Electronics Inc., Seoul (KR)

(72) Inventors: Kilbom Lee, Seoul (KR); Jiwon Kang, Seoul (KR); Kitae Kim, Seoul (KR); Kungmin Park, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 472 days.

(21) Appl. No.: 15/551,435

(22) PCT Filed: Jan. 20, 2016

(86) PCT No.: PCT/KR2016/000601
§ 371 (c)(1),
(2) Date: Aug. 16, 2017

(87) PCT Pub. No.: WO2016/133287
PCT Pub. Date: Aug. 25, 2016

(65) Prior Publication Data
US 2018/0045821 A1      Feb. 15, 2018

Related U.S. Application Data

(60) Provisional application No. 62/116,929, filed on Feb. 17, 2015.

(51) Int. Cl.
*H04B 1/10* (2006.01)
*G01S 13/50* (2006.01)
(Continued)

(52) U.S. Cl.
CPC ............. *G01S 13/505* (2013.01); *H04J 11/00* (2013.01); *H04L 25/03821* (2013.01);
(Continued)

(58) Field of Classification Search
CPC .. G01S 13/505; H04J 11/00; H04L 25/03821; H04L 27/2657; H04L 27/26; H04W 72/1278; H04W 84/0218
(Continued)

(56) References Cited

U.S. PATENT DOCUMENTS 7,349,483 B2 *  3/2008  Seki ........................ H04B 7/01
                                                          375/147
7,599,453 B2 * 10/2009  Wilhelmsson ...... H04L 27/2657
                                                         342/357.29
(Continued)

FOREIGN PATENT DOCUMENTS

WO     2010143861 A2    12/2010
WO     2014057055 A1     4/2014

*Primary Examiner* — Tesfaldet Bocure
(74) *Attorney, Agent, or Firm* — Dentons US LLP

(57) ABSTRACT

Disclosed is a Doppler measurement method comprising: generating a first function defined by reception signals in two consecutive subcarriers for a specific OFDM symbol; generating a second function defined on the basis of the signs and sizes of a real part and an imaginary part of the first function; repeatedly performing a process of generating the first function and the second function for all of a set of OFDM symbols; and determining, as a Doppler value, the phase of a third function obtained by adding the results of repeatedly performing the process.

16 Claims, 20 Drawing Sheets

(51) Int. Cl.
*H04L 25/03* (2006.01)
*H04L 27/26* (2006.01)
*H04J 11/00* (2006.01)
*H04W 72/12* (2009.01)
*H04W 84/02* (2009.01)

(52) U.S. Cl.
CPC ..... *H04L 27/2657* (2013.01); *H04W 72/1278* (2013.01); *H04W 84/02* (2013.01); *H04L 27/2676* (2013.01)

(58) Field of Classification Search
USPC .................................................. 375/260, 346
See application file for complete search history.

(56) References Cited

U.S. PATENT DOCUMENTS

| | | | |
|---|---|---|---|
| 8,428,018 B2 * | 4/2013 | Noh | H04B 7/0452 370/208 |
| 2006/0239364 A1 * | 10/2006 | Wilhelmsson | H04L 27/2657 375/260 |
| 2009/0073869 A1 | 3/2009 | Chadha et al. | |
| 2009/0129204 A1 | 5/2009 | Zhou et al. | |
| 2010/0309994 A1 | 12/2010 | Dent et al. | |
| 2018/0013592 A1 * | 1/2018 | Liu | H04B 17/391 |
| 2018/0227717 A1 * | 8/2018 | Bhardwaj | H04W 4/06 |

* cited by examiner

FIG. 18
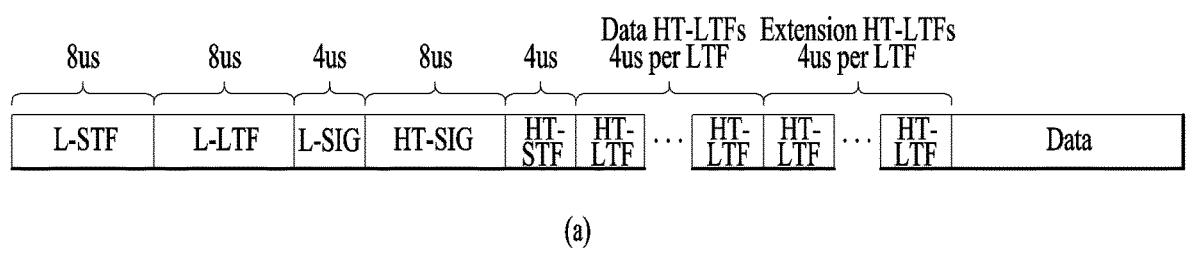
(a)
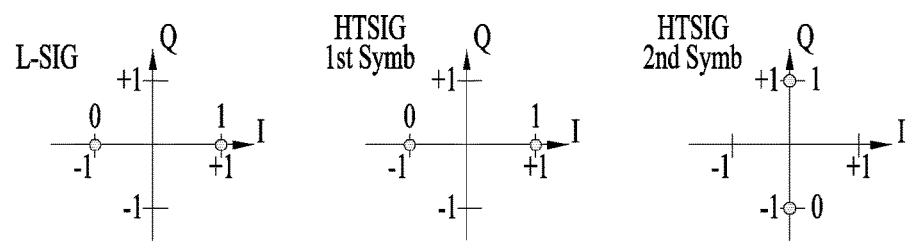
(b)

FIG. 19
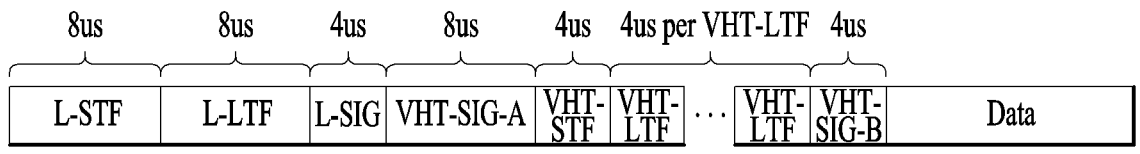
(a)
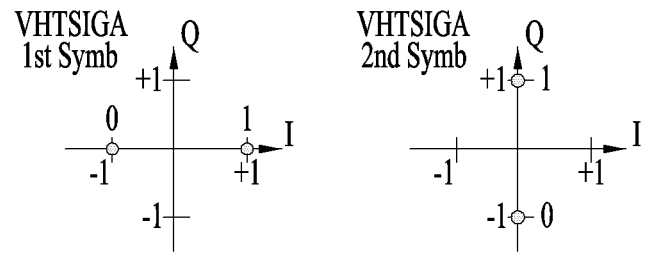
(b)
FIG. 20
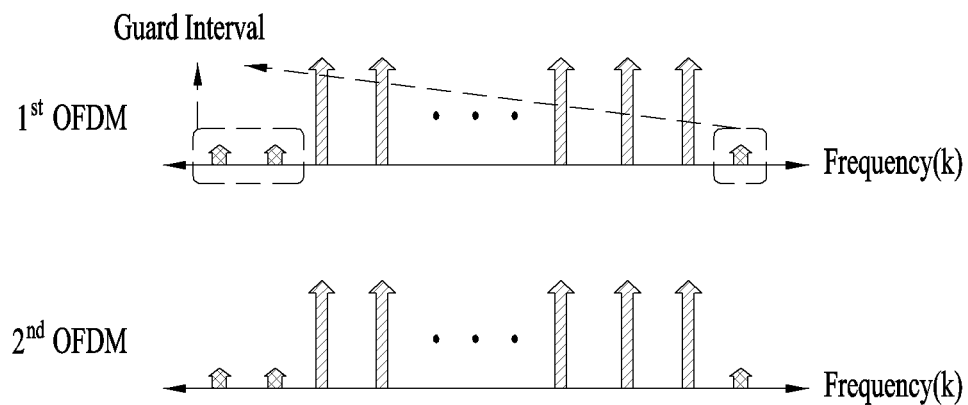

DOPPLER MEASUREMENT METHOD IN WIRELESS LAN SYSTEM

This application is a 35 USC § 371 National Stage entry of International Application No. PCT/KR2016/000601, filed on Jan. 20, 2016, and claims priority to U.S. Provisional Application No. 62/116,929, filed on Feb. 17, 2015, which is hereby incorporated by reference in its entireties for all purposes as if fully set forth herein.

TECHNICAL FIELD

The present invention relates to a wireless communication system, and more particularly, to a method and apparatus for measuring a Doppler effect in a wireless local area network (WLAN) system.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. As in M2M communication, if the number of apparatuses is increased, in order to reduce unnecessary power consumption and interference, a channel access mechanism needs to be more efficiently improved.

DISCLOSURE OF THE INVENTION

Technical Task

The present invention is devised to solve the above-mentioned technical problems. Particularly, an object of the present invention is to accurately measure the Doppler effect at a reception module.

Another object of the present invention is to improve a reception SINR (signal to interference plus noise ratio) by eliminating the measured Doppler effect from a received signal.

A further object of the present invention is to improve communication efficiency by eliminating a CFO (carrier frequency offset) effect and the Doppler effect from a received signal.

The technical problems solved by the present invention are not limited to the above technical problems and other technical problems which are not described herein will become apparent to those skilled in the art from the following description.

Technical Solutions

To achieve these objects and other advantages and in accordance with the purpose of the invention, as embodied and broadly described herein, a Doppler measurement method may include: generating a first function defined by signals received on two consecutive subcarriers for a specific orthogonal frequency division multiplexing (OFDM) symbol; generating a second function defined based on signs and magnitudes of real and imaginary parts of the first function; repeatedly performing a process for generating the first and second functions for an entire set of OFDM symbols; and determining a phase of a third function generated by adding results of the repetition as a Doppler value.

The Doppler measurement method may further include: before generating the first function, estimating a carrier frequency offset (CFO) from data received from a transmission module in a blind manner; and generating a candidate signal, where the Doppler value will be measured, by eliminating an effect of the estimated CFO from the data.

The Doppler measurement method may further include eliminating a Doppler effect by compensating the Doppler value measured with respect to the candidate signal in a frequency domain.

The first function may be defined according to the following equation.

$$\tilde{y}_k^n \triangleq r_{k+1}^n (r_k^n)^* \qquad \text{[Equation]}$$

where n indicates an OFDM symbol index, k indicates a subcarrier index, $\tilde{y}_k^n$ indicates the first function, and $r_k^n$ indicates the received signal(s).

The second function may be defined according to the following equation.

$$z_k^n = \begin{cases} \tilde{y}_k^n & \text{if } \operatorname{real}(\tilde{y}_k^n) \geq 0, \operatorname{real}(\tilde{y}_k^n) \geq \operatorname{imag}(\tilde{y}_k^n) \\ -\tilde{y}_k^n & \text{if } \operatorname{real}(\tilde{y}_k^n) < 0, \operatorname{real}(\tilde{y}_k^n) \geq \operatorname{imag}(\tilde{y}_k^n) \\ -j \times \tilde{y}_k^n & \text{if } \operatorname{imag}(\tilde{y}_k^n) \geq 0, \operatorname{real}(\tilde{y}_k^n) < \operatorname{imag}(\tilde{y}_k^n) \\ j \times \tilde{y}_k^n & \text{if } \operatorname{imag}(\tilde{y}_k^n) < 0, \operatorname{real}(\tilde{y}_k^n) < \operatorname{imag}(\tilde{y}_k^n) \end{cases} \qquad \text{[Equation]}$$

where $\tilde{y}_k^n$ indicates the first function, $Z_k^n$ indicates the second function, $\operatorname{real}(\tilde{y}_k^n)$ indicates the real part of the first function, and $\operatorname{imag}(\tilde{y}_k^n)$ indicates the imaginary part of the first function.

The third function may be defined according to the following equation.

$$\beta = \angle \left( \sum_{n=1}^{L} \sum_{k \in C_n} z_k^n \right) \times \frac{N}{\pi(N-1)} \qquad \text{[Equation]}$$

where β indicates the Doppler value, n indicates an OFDM symbol index, L indicates the number of total OFDM symbols, k indicates a subcarrier index, C indicates a set of all subcarriers, $z_k^n$ indicates the second function, and N indicates an OFDM symbol length.

The Doppler measurement method may further include eliminating an effect of the Doppler value from data received from a transmission module, and in this case, the eliminating the effect of the Doppler value from data received from the transmission module may include eliminating the effect of the Doppler value using an interference matrix that indicates interference between subcarriers for data from which a carrier frequency offset (CFO) effect is eliminated.

The eliminating the effect of the Doppler value from data received from the transmission module may include eliminating the effect of the Doppler value using an approximated interference matrix, which is a block diagonal form of the interference matrix.

Sizes of block elements of the approximated interference matrix may be determined based on at least one of the Doppler value and maximum complexity of the reception module.

In another aspect of the present invention, provided is a reception module, including: a transmitter, a receiver, and a processor connected to the transmitter and the receiver. In this case, the processor may be configured to: generate a first function defined by signals received on two consecutive subcarriers for a specific orthogonal frequency division multiplexing (OFDM) symbol; generate a second function defined based on signs and magnitudes of real and imaginary parts of the first function; repeatedly perform a process for generating the first and second functions for an entire set of OFDM symbols; and determine a phase of a third function generated by adding results of the repetition as a Doppler value.

Advantageous Effects

According to the embodiments of the present invention have the following effects.

First, it is possible to improve the communication efficiency by eliminating the CFO effect and the Doppler effect from the received signal.

Second, since a Doppler value is measured in a blind manner, the amount of complexity necessary for the communication efficiency improvement can be decreased.

Third, it is possible to not only reduce calculation complexity of the reception module but also minimize performance degradation of the reception module while eliminating the Doppler effect.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIGS. 17 to 19 are diagrams illustrating frame structures according to the present invention and constellations thereof.

FIG. 20 is a diagram illustrating frequency-domain pilot signals according to the present invention.

BEST MODE FOR INVENTION

Figure 1:
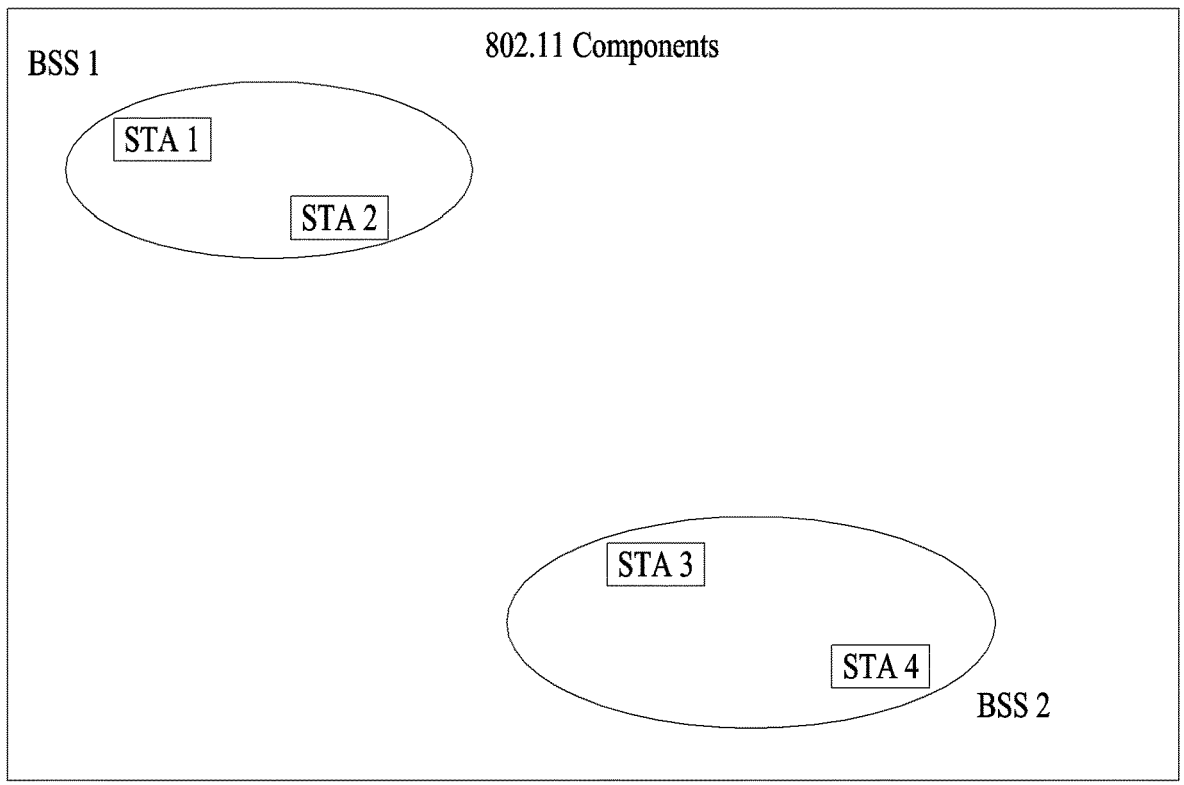
FIG. 1 is a diagram showing an exemplary structure of an IEEE 802.11 system to which the present invention is applicable.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. IEEE 802.11 System Overview 1.1 Structure of WLAN System

FIG. 1 is a diagram showing an exemplary structure of an IEEE 802.11 system to which the present invention is applicable.

An IEEE 802.11 structure may be composed of a plurality of components and a wireless local area network (WLAN) supporting station (STA) mobility transparent to a higher layer may be provided by interaction among the components. A basic service set (BSS) may correspond to a basic component block in an IEEE 802.11 LAN. In FIG. 1, two BSSs (BSS1 and BSS2) are present and each BSS includes two STAs (STA1 and STA2 are included in BSS1 and STA3 and STA4 are included in BSS2) as members. In FIG. 1, an ellipse indicating the BSS indicates a coverage area in which STAs included in the BSS maintains communication. This area may be referred to as a basic service area (BSA). If an STA moves out of a BSA, the STA cannot directly communicate with other STAs in the BSA.

In an IEEE 802.11 LAN, a BSS is basically an independent BSS (IBSS). For example, the IBSS may have only two STAs. In addition, the simplest BSS (BSS1 or BSS2) of FIG. 1, in which other components are omitted, may correspond to a representative example of the IBSS. Such a configuration is possible when STAs can directly perform communication. In addition, such a LAN is not configured in advance but may be configured if a LAN is necessary. This LAN may also be referred to as an ad-hoc network.

If an STA is turned on or off or if an STA enters or moves out of a BSS, the membership of the STA in the BSS may be dynamically changed. An STA may join a BSS using a synchronization process in order to become a member of the BSS. In order to access all services of a BSS based structure, an STA should be associated with the BSS. Such association may be dynamically set and may include use of a distribution system service (DSS).

Figure 2:
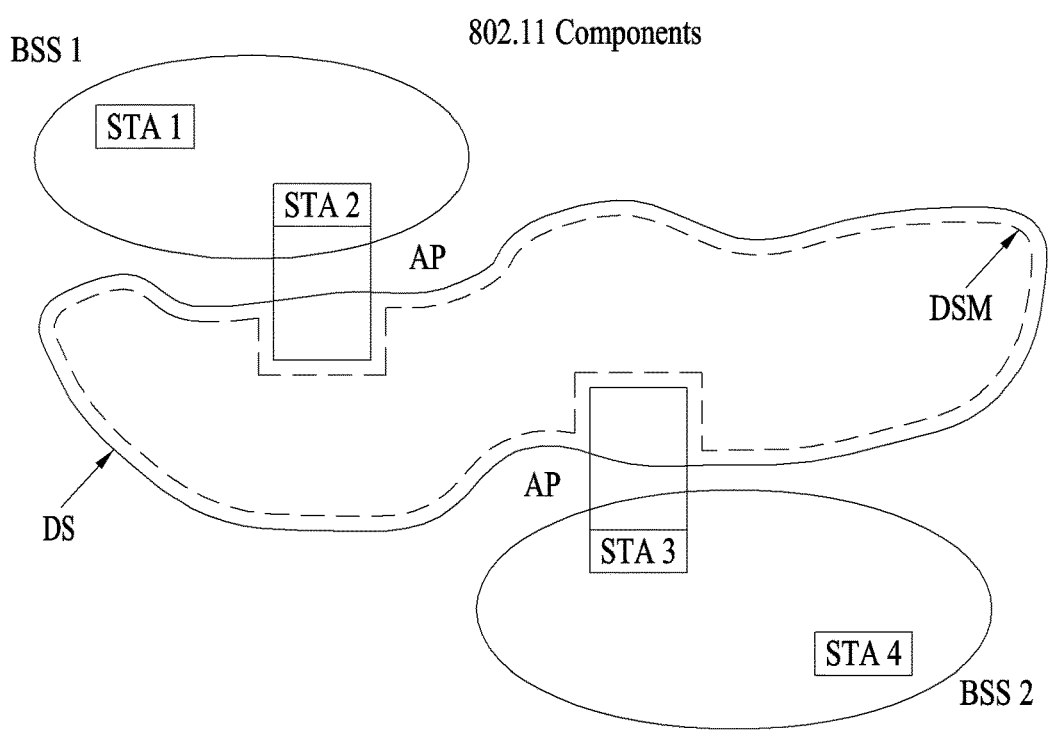
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, a distribution system (DS), a distribution system medium (DSM) and an access point (AP) are added to the structure of FIG. 1.

In a LAN, a direct station-to-station distance may be restricted by PHY performance Although such distance restriction may be possible, communication between stations located at a longer distance may be necessary. In order to support extended coverage, a DS may be configured.

The DS means a structure in which BSSs are mutually connected. More specifically, the BSSs are not independently present as shown in FIG. 1 but the BSS may be present as an extended component of a network including a plurality of BSSs.

The DS is a logical concept and may be specified by characteristics of the DSM. In IEEE 802.11 standards, a wireless medium (WM) and a DSM are logically distinguished. Logical media are used for different purposes and are used by different components. In IEEE 802.11 standards, such media are not restricted to the same or different media. Since plural media are logically different, an IEEE 802.11 LAN structure (a DS structure or another network structure) may be flexible. That is, the IEEE 802.11 LAN structure may be variously implemented and a LAN structure may be independently specified by physical properties of each implementation.

The DS provides seamless integration of a plurality of BSSs and provides logical services necessary to treat an address to a destination so as to support a mobile apparatus.

The AP means an entity which enables associated STAs to access the DS via the WM and has STA functionality. Data transfer between the BSS and the DS may be performed via the AP. For example, STA2 and STA3 shown in FIG. 2 have STA functionality and provide a function enabling associated STAs (STA1 and STA4) to access the DS. In addition, since all APs correspond to STAs, all APs may be addressable entities. An address used by the AP for communication on the WM and an address used by the AP for communication on the DSM may not be equal.

Data transmitted from one of STAs associated with the AP to the STA address of the AP may always be received by an uncontrolled port and processed by an IEEE 802.1X port access entity. In addition, if a controlled port is authenticated, transmission data (or frames) may be transmitted to the DS.

Figure 3:
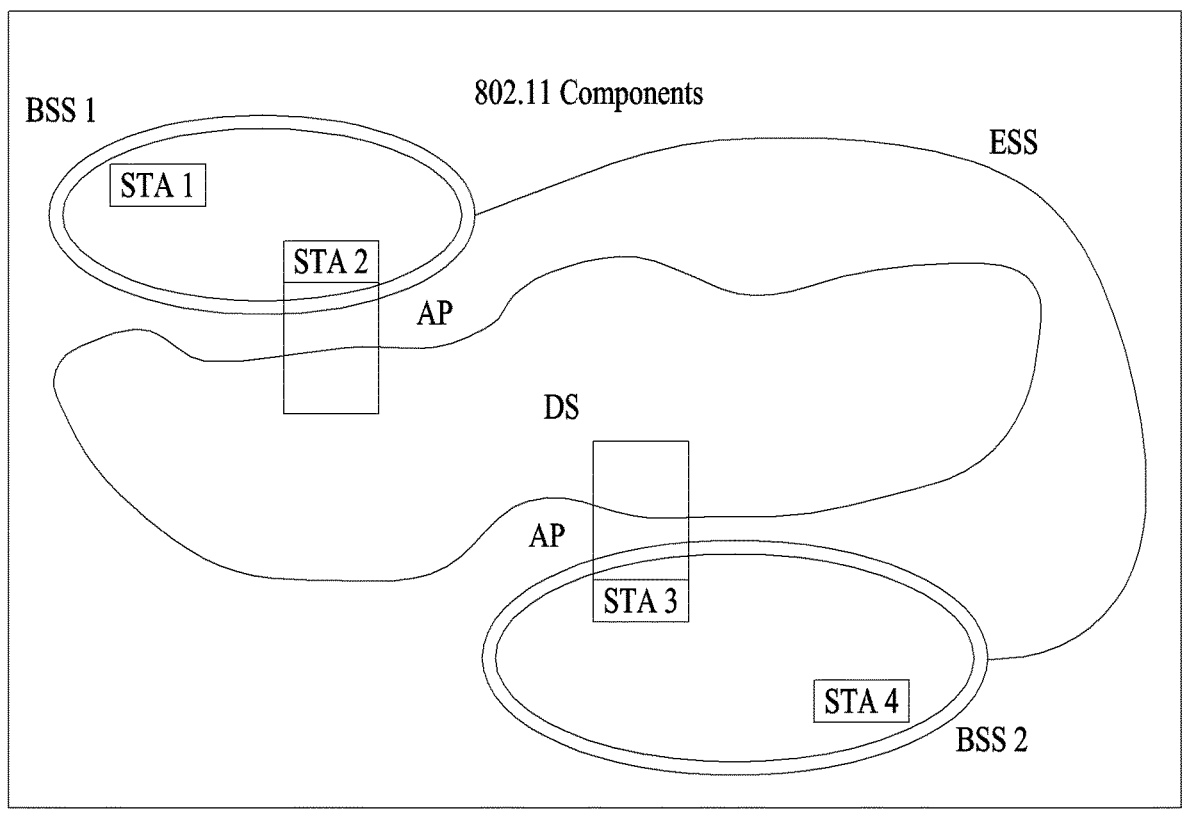
FIG. 3 is a diagram showing another exemplary structure of an IEEE 802.11 system to which the present invention is applicable.

FIG. 3 is a diagram showing another exemplary structure of an IEEE 802.11 system to which the present invention is applicable. In FIG. 3, an extended service set (ESS) for providing wide coverage is added to the structure of FIG. 2.

A wireless network having an arbitrary size and complexity may be composed of a DS and BSSs. In an IEEE 802.11 system, such a network is referred to as an ESS network. The ESS may correspond to a set of BSSs connected to one DS. However, the ESS does not include the DS. The ESS network appears as an IBSS network at a logical link control (LLC) layer. STAs included in the ESS may communicate with each other and mobile STAs may move from one BSS to another BSS (within the same ESS) transparently to the LLC layer.

In IEEE 802.11, relative physical locations of the BSSs in FIG. 3 are not assumed and may be defined as follows. The BSSs may partially overlap in order to provide consecutive coverage. In addition, the BSSs may not be physically connected and a distance between BSSs is not logically restricted. In addition, the BSSs may be physically located at the same location in order to provide redundancy. In addition, one (or more) IBSS or ESS network may be physically present in the same space as one (or more) ESS network. This corresponds to an ESS network type such as a case in which an ad-hoc network operates at a location where the ESS network is present, a case in which IEEE 802.11 networks physically overlapped by different organizations are configured or a case in which two or more different access and security policies are necessary at the same location.

Figure 4:
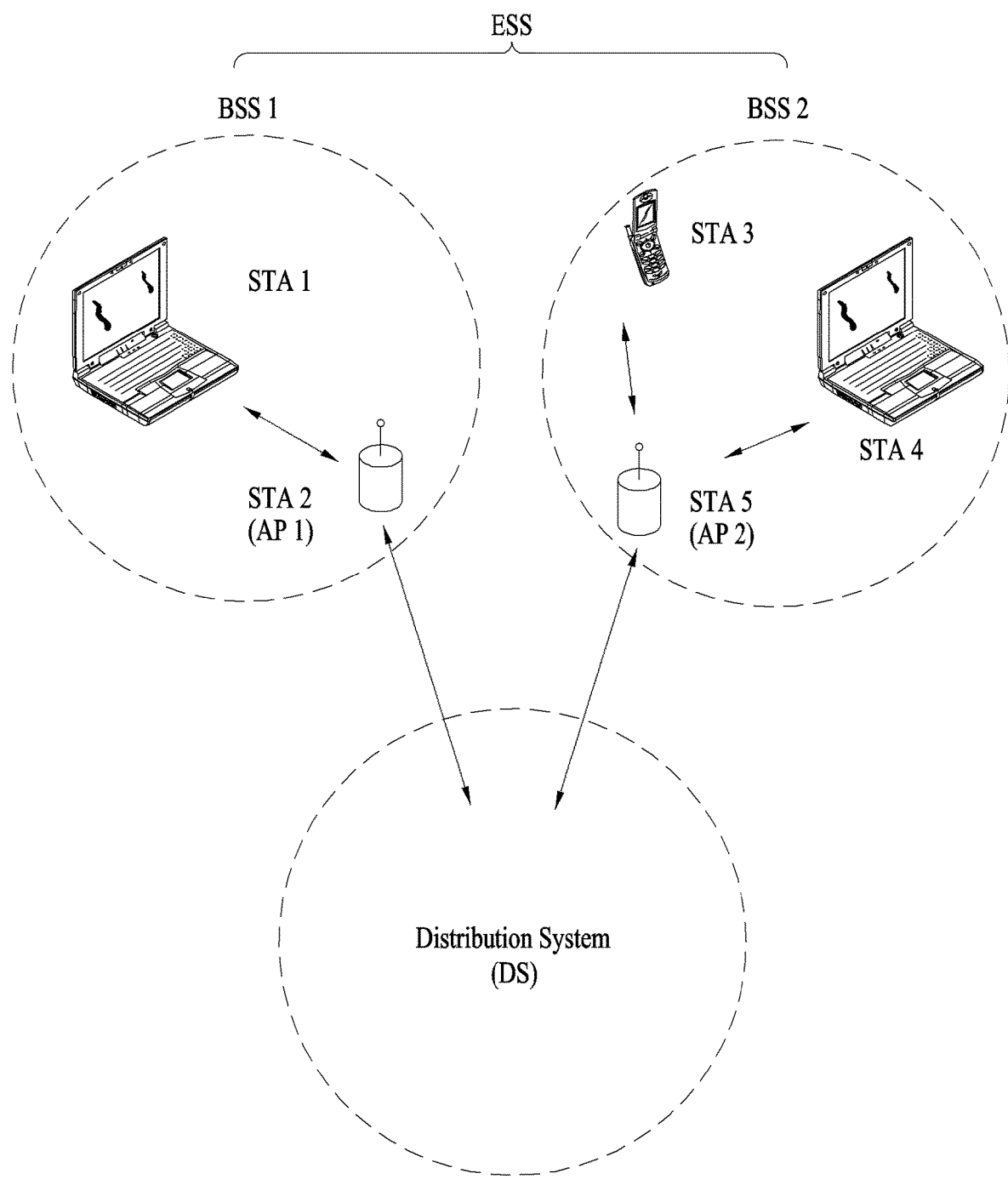
FIG. 4 is a diagram showing an exemplary structure of a WLAN system.

FIG. 4 is a diagram showing an exemplary structure of a WLAN system. FIG. 4 shows an example of an infrastructure BSS including a DS.

In the example of FIG. 4, BSS1 and BSS2 configure an ESS. In the WLAN system, an STA operates according to a MAC/PHY rule of IEEE 802.11. The STA includes an AP STA and a non-AP STA. The non-AP STA corresponds to an apparatus directly handled by a user, such as a laptop or a mobile phone. In the example of FIG. 4, STA1, STA3 and STA4 correspond to the non-AP STA and STA2 and STA5 correspond to the AP STA.

In the following description, the non-AP STA may be referred to as a terminal, a wireless transmit/receive unit (WTRU), a user equipment (UE), a mobile station (MS), a mobile terminal or a mobile subscriber station (MSS). In addition, the AP may correspond to a base station (BS), a Node-B, an evolved Node-B (eNB), a base transceiver system (BTS) or a femto BS.

1.2 Link Setup Process

Figure 5:
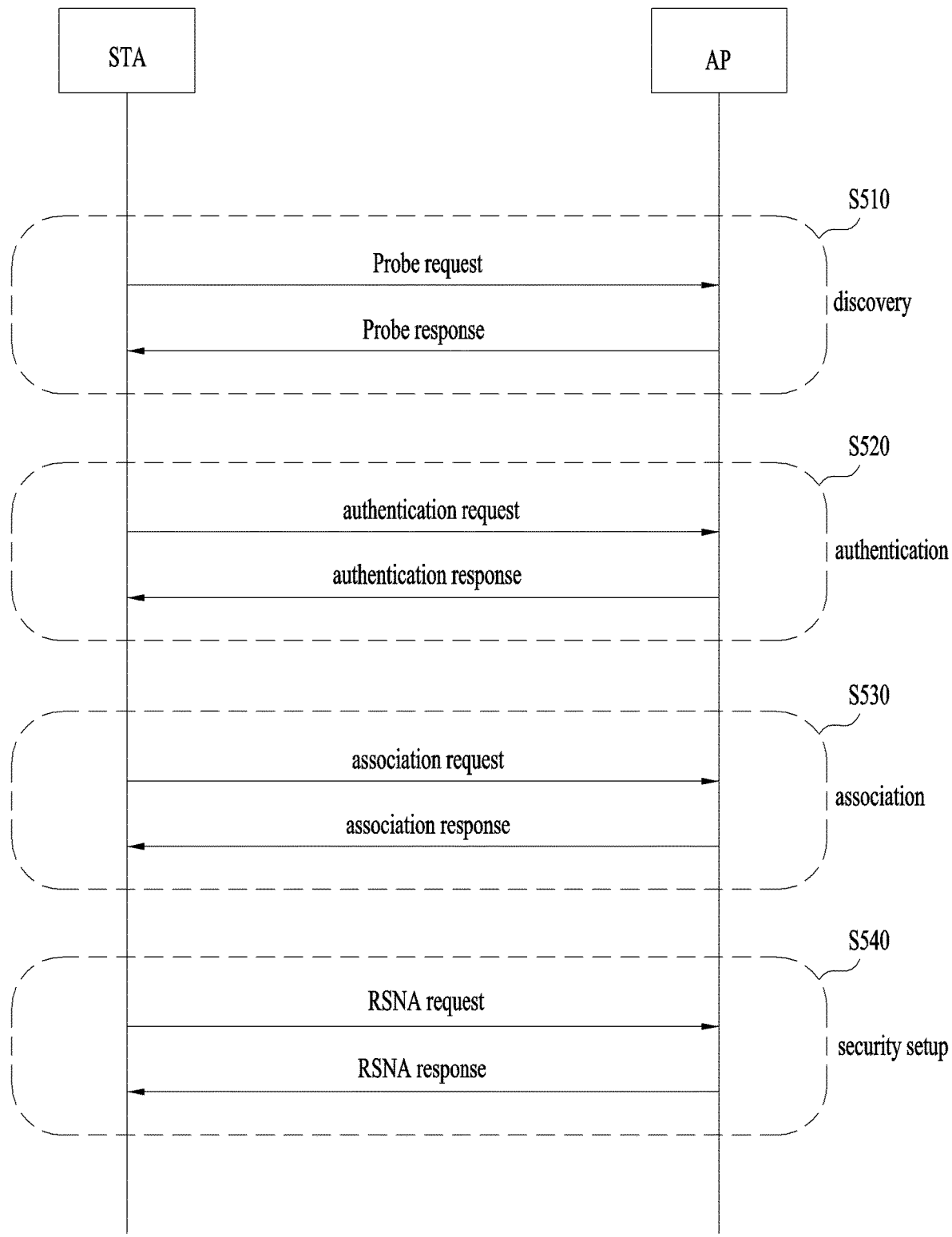
FIG. 5 is a diagram illustrating a link setup process in a WLAN system.

FIG. 5 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 5.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning The scanning method includes an active scanning method and a passive scanning method.

In FIG. 5, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

Although not shown in FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel The STA which receives the beacon frame may store BSS related information included in the received beacon frame, move to a next channel and perform scanning on the next channel using the same method.

Active scanning has delay and power consumption less than those of passive scanning.

After the STA has discovered the network, an authentication process may be performed in step S520. Such an authentication process may be referred to as a first authentication process to be distinguished from a security setup operation of step S540.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA is successfully authenticated, an association process may be performed in step S530. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capability, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S540. The security setup process of step S540 may be referred to as an authentication process through a robust security network association (RSNA) request/response. The authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL) frame. In addition, the security setup process may be performed according to a security method which is not defined in the IEEE 802.11 standard.

2.1 Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel According to the MU-MIMO transmission scheme, the AP may simultaneously transmit packets to one or more MIMO-paired STAs.

In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. It may be determined that the licensed user uses the frequency band if received signal strength is equal to or greater than a predetermined value or if a DTV preamble is detected.

In addition, as next-generation communication technology, machine-to-machine (M2M) communication technology is being discussed. Even in an IEEE 802.11 WLAN system, a technical standard supporting M2M communication has been developed as IEEE 802.11ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

2.2 Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 6:
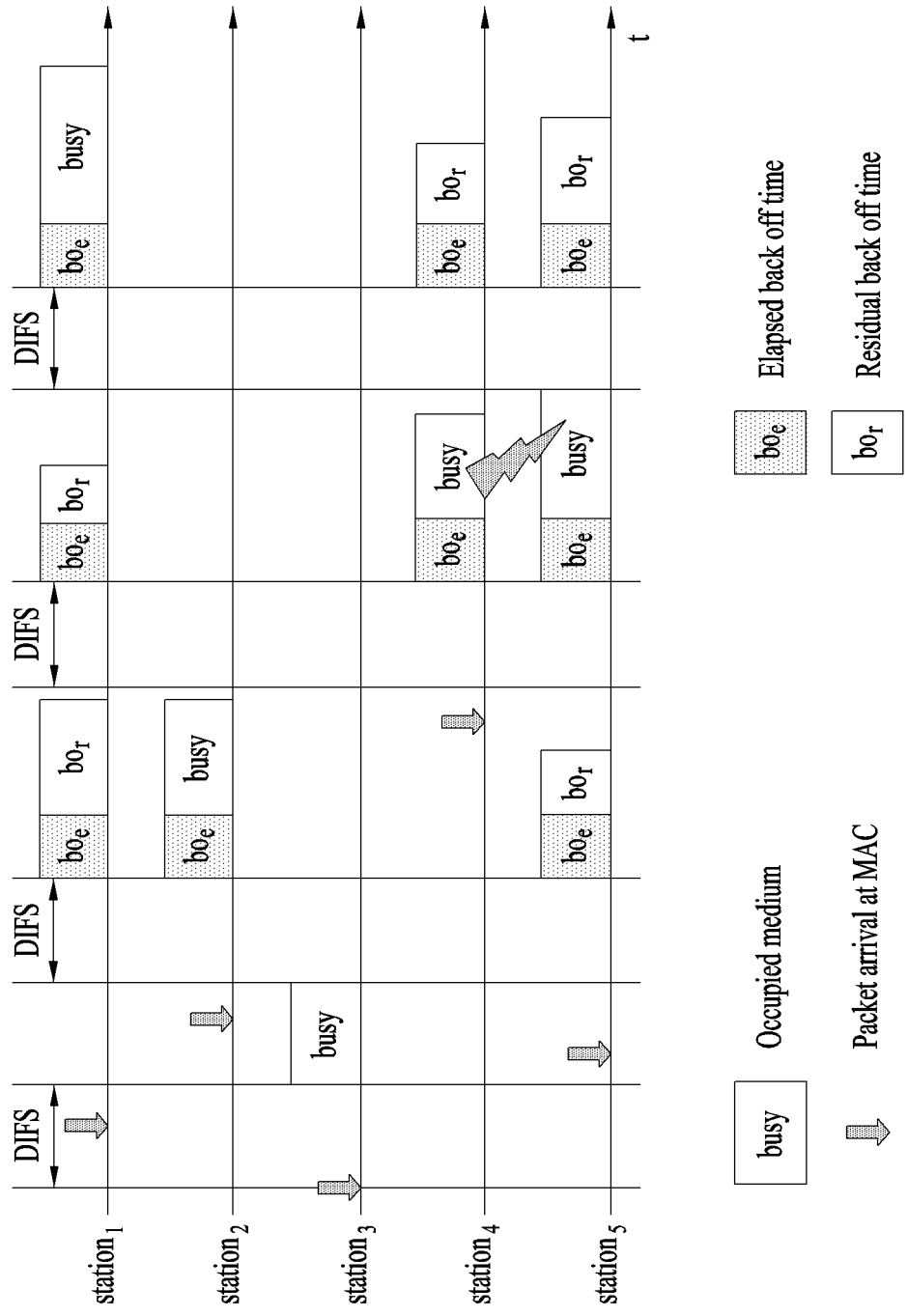
FIG. 6 is a diagram illustrating a backoff process.

FIG. 6 is a diagram illustrating a backoff process.

Operation based on a random backoff period will be described with reference to FIG. 6. If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin CW, CWmin and CWmax values are preferably set to 2n-1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 6, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values.

In the example of FIG. 6, STA2 selects a smallest backoff count value and STA1 selects a largest backoff count value.

That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission.

If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

2.3 Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 7 and 8. Although a transmission range may not be equal to an actual carrier sensing range, for convenience, assume that the transmission range may be equal to the actual carrier sensing range.

Figure 7:
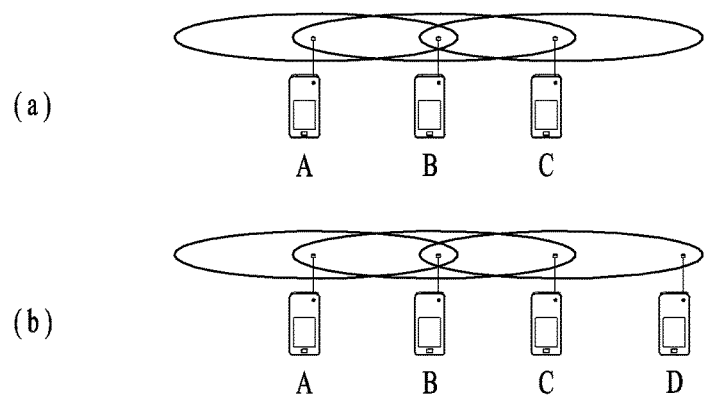
FIG. 7 is a diagram illustrating a hidden node and an exposed node.

FIG. 7 is a diagram illustrating a hidden node and an exposed node.

FIG. 7(a) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 7(b) shows an exposed node and, in this case, the STA B transmits data to the STA A and the STA C has information to be transmitted to the STA D. In this case, if the STA C performs carrier sensing, it may be determined that the medium is busy due to transmission of the STA B. If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be the exposed node of the STA B.

Figure 8:
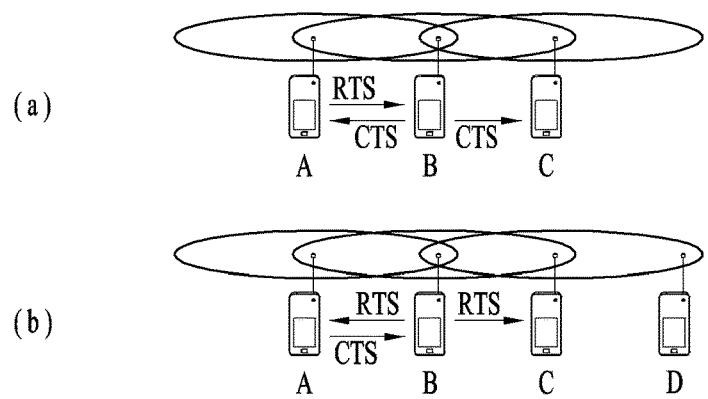
FIG. 8 is a diagram illustrating request to send (RTS) and clear to send (CTS).

FIG. 8 is a diagram illustrating request to send (RTS) and clear to send (CTS).

In the example of FIG. 7, in order to efficiently use a collision avoidance mechanism, short signaling packet such as RTS and CTS may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 8(a) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 8(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

2.4 Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception or channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 9:
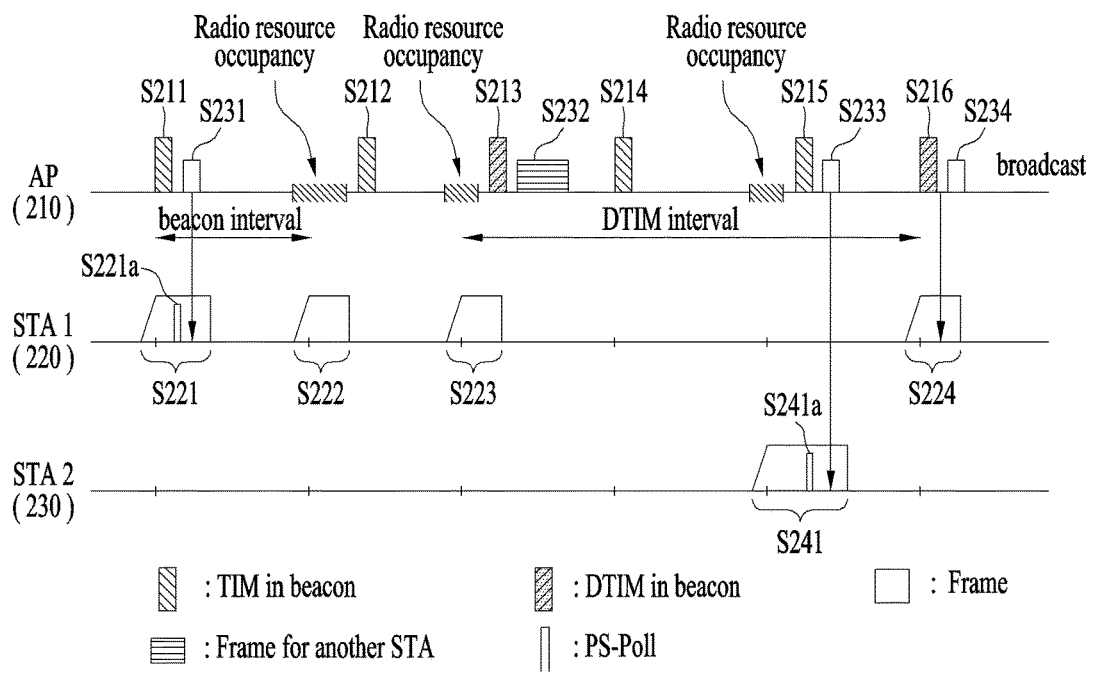
FIG. 9 is a diagram illustrating power management operation.

FIG. 9 is a diagram illustrating power management operation.

Referring to FIG. 9, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times. An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221a). The AP 210 may transmit the frame to the STA1 220 in correspondence with the PS-Poll frame (S231). The STA1 220 which completes frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefor is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241a) in order to request frame transmission. The AP 210 may transmit the frame to the STA2 230 in correspondence with the PS-Poll frame (S233).

For PM management shown in FIG. 9, a TIM element includes a TIM indicating whether a frame to be transmitted to an STA is present and a DTIM indicating whether a broadcast/multicast frame is present. The DTIM may be implemented by setting a field of the TIM element.

Figure 10:
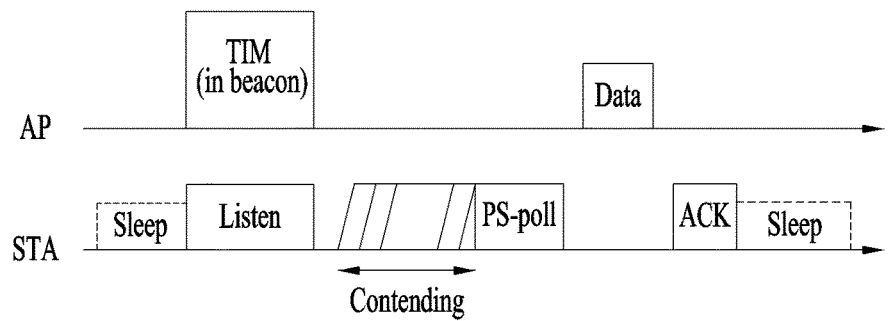
FIGS. 10 to 12 are diagrams illustrating operation of a station (STA) which receives a traffic indication map (TIM).
Figure 11:
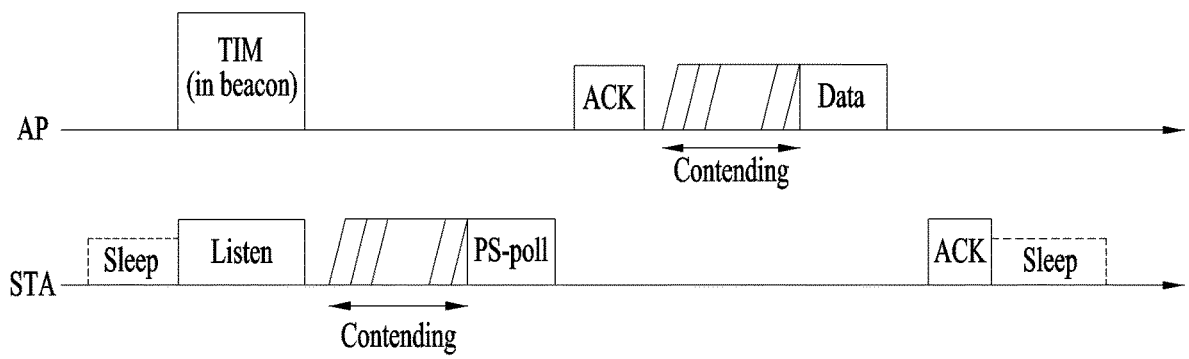
Figure 12:
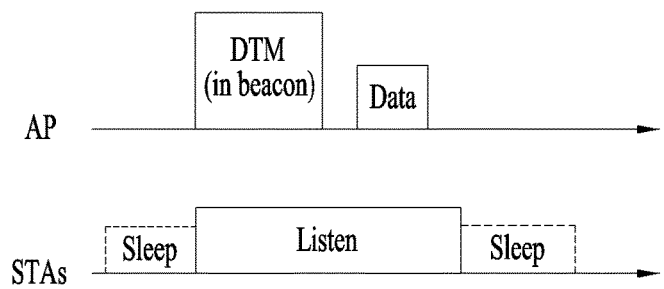

FIGS. 10 to 12 are diagrams illustrating operation of a station (STA) which receives a traffic indication map (TIM).

Referring to FIG. 10, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which receives the PS-Poll frame transmitted by the STA may transmit the frame to the STA. The STA may receive the data frame and transmit an ACK frame to the AP. Thereafter, the STA may be switched to the sleep state again.

As shown in FIG. 10, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 11.

In the example of FIG. 11, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 12 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

2.5 TIM Structure

In the PM mode management method based on the TIM (or DTIM) protocol described with reference to FIGS. 9 to 12, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 13.

FIG. 13(a) shows an example of AIDs assigned based on a group. In the example of FIG. 13(a), several bits of a front part of the AID bitmap may be used to indicate the GID. For example, four DIDs may be expressed by the first two bits of the AID of the AID bitmap. If the total length of the AID bitmap is N bits, the first two bits (B1 and B2) indicate the GID of the AID.

FIG. 13(a) shows another example of AIDs assigned based on a group. In the example of FIG. 13(b), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(b), assume that all AIDs of 1 to N4 are divided into four groups. In this case, AIDs belonging to GID 1 are 1 to N1 and may be expressed by an offset 1 and a length N1. AIDs belonging to GID2 may be expressed by an offset N1+1 and a length N2−N1+1, AIDs belonging to GID 3 may be expressed by an offset N2+1 and a length N3−N2+1, and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 13(c). FIG. 13(c) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 13(c), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

Figure 13:
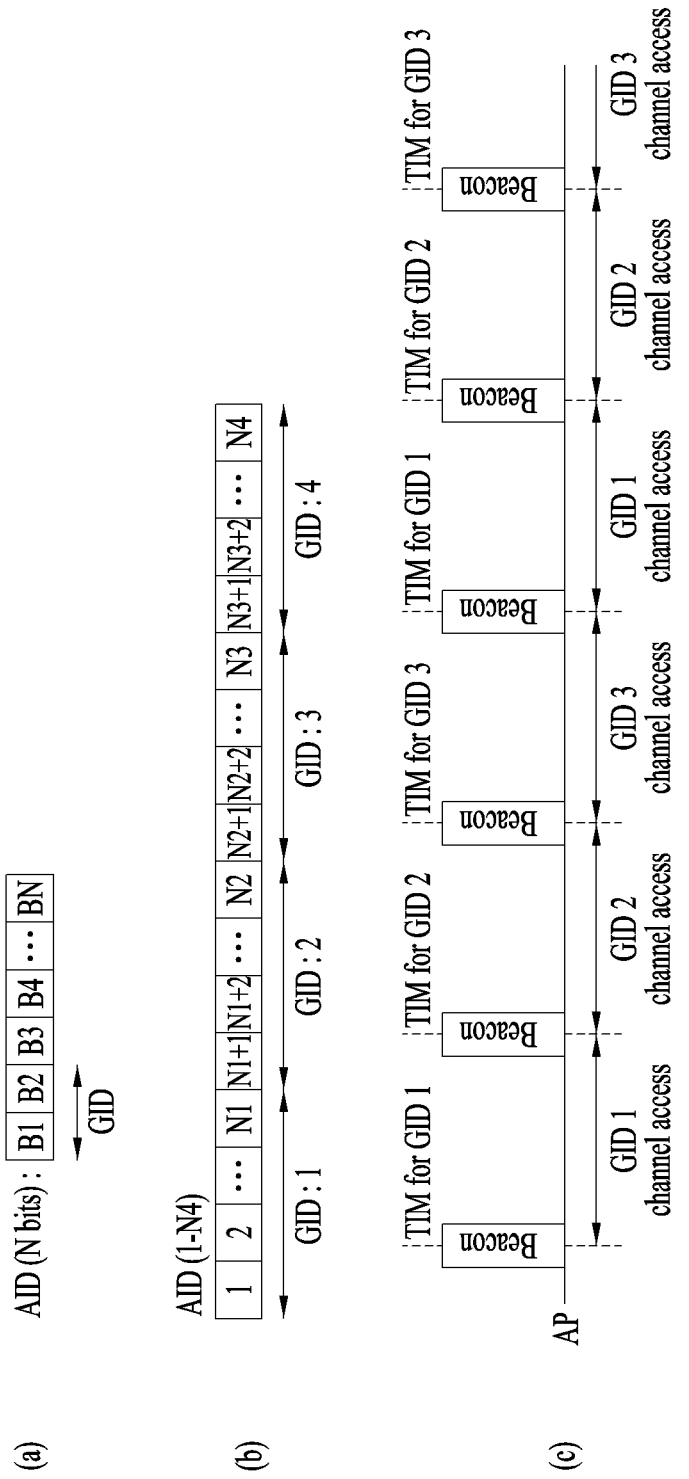
FIG. 13 is a diagram illustrating a group based association identifier (AID).

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 13, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 13(a), the first N1 bits of the AID bitmap indicate a paging ID (that is, a PID), the next N2 bits indicate a block ID, the next N3 bits indicate a sub-block ID, and the remaining bits indicate the STA bit location in the sub-block.

In the following examples of the present invention, various methods of dividing and managing STAs (or AIDs assigned to the STAs) on a predetermined hierarchical group basis are applied and the group based AID assignment method is not limited to the above examples.

2.6 Improved Channel Access Method

If AIDs are assigned/managed based on a group, STAs belonging to a specific group may use a channel only at a "group channel access interval (or RAW)" assigned to the group. If an STA supports an M2M application, traffic for the STA may have a property which may be generated at a long period (e.g., several tens of minutes or several hours). Since such an STA does not need to be in the awake state frequently, the STA may be in the sleep mode for g a long period of time and be occasionally switched to the awake state (that is, the awake interval of the STA may be set to be long). An STA having a long wakeup interval may be referred to as an STA which operates in a "long-sleeper" or "long-sleep" mode. The case in which the wakeup interval is set to be long is not limited to M2M communication and the wakeup interval may be set to be long according to the state of the STA or surroundings of the STA even in normal WLAN operation.

If the wakeup interval is set, the STA may determine whether a local clock thereof exceeds the wakeup interval. However, since the local clock of the STA generally uses a cheap oscillator, an error probability is high. In addition, if the STA operates in long-sleep mode, the error may be increased with time. Accordingly, time synchronization of the STA which occasionally wakes up may not match time synchronization of the AP. For example, although the STA computes when the STA may receive the beacon frame to be switched to the awake state, the STA may not actually receive the beacon frame from the AP at that timing. That is, due to clock drift, the STA may miss the beacon frame and such a problem may frequently occur if the STA operates in the long sleep mode.

Figure 14:
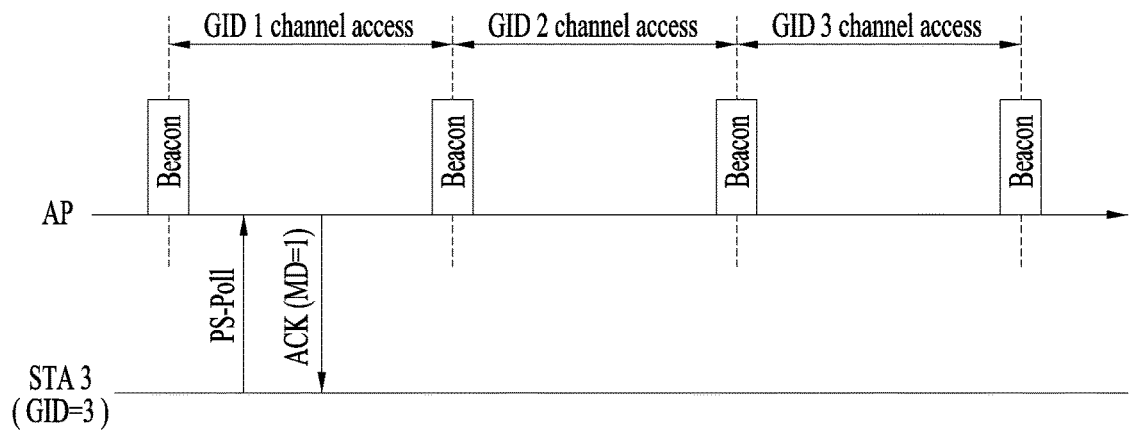
FIGS. 14 to 16 are diagrams showing examples of operation of an STA if a group channel access interval is set.
Figure 15:
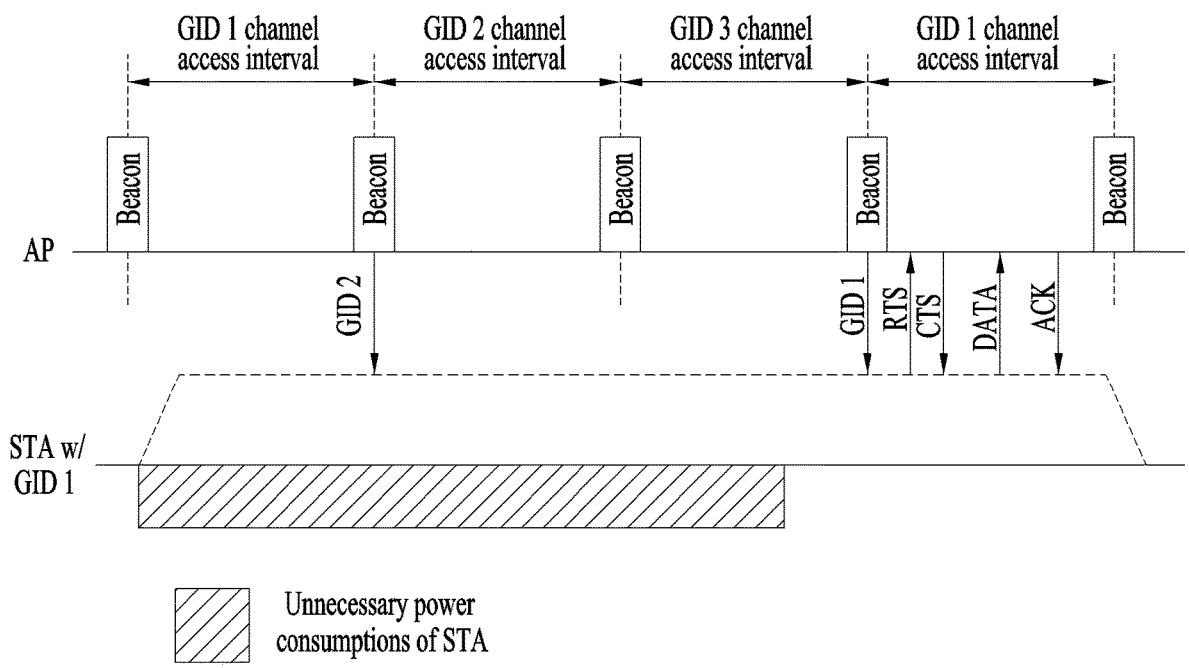
Figure 16:
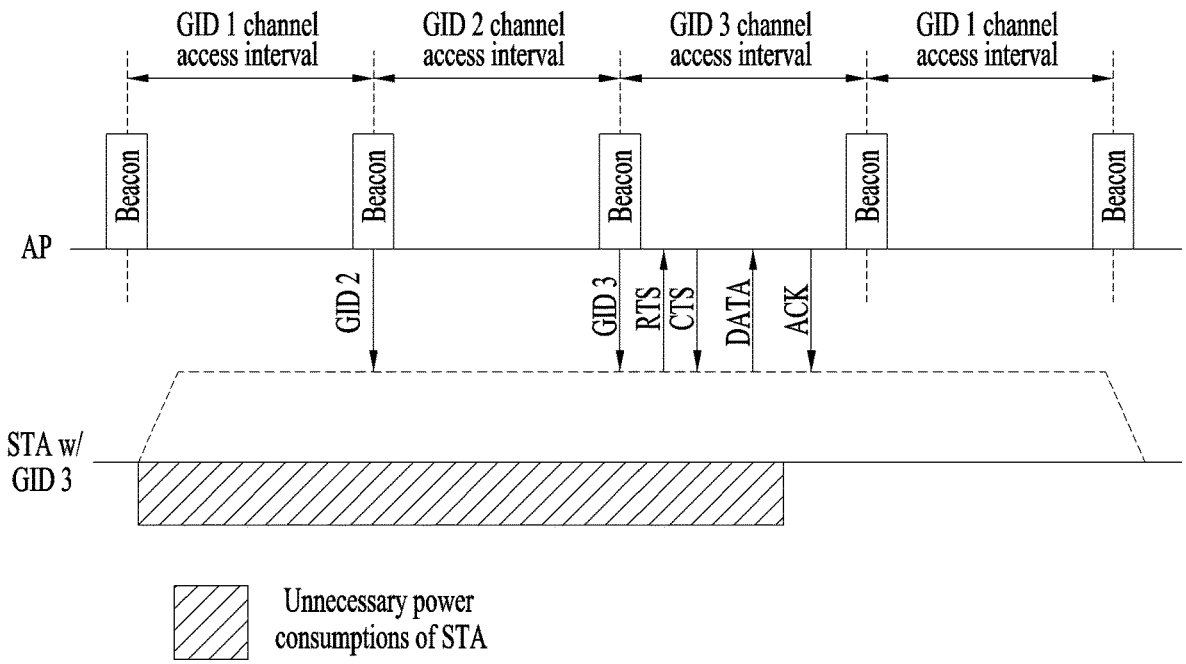

FIGS. 14 to 16 are diagrams showing examples of operation of an STA if a group channel access interval is set.

In the example of FIG. 14, STA3 may belong to group 3 (that is, GID=3), wake up at a channel access interval assigned to group 1 and perform PS-Poll for requesting frame transmission from the AP. The AP which receives PS-Poll from the STA transmits an ACK frame to STA3. If buffered data to be transmitted to STA3 is present, the AP may provide information indicating that data to be transmitted is present via the ACK frame. For example, the value of a "More Data" field (or an MD field) having a size of 1 bit included in the ACK frame may be set to 1 (that is, MD=1) to indicate the above information.

Since a time when STA3 transmits PS-Poll belongs to the channel access interval for group 1, even if data to be transmitted to STA3 is present, the AP does not immediately transmit data after transmitting the ACK frame but transmits data to STA3 at a channel access interval (GID 3 channel access of FIG. 14) assigned to group 3 to which STA3 belongs.

Since STA3 receives the ACK frame set to MD=1 from the AP, STA3 continuously waits for transmission of data from the AP. That is, in the example of FIG. 14, since STA3 cannot receive the beacon frame immediately after waking up, STA3 transmits PS-Poll to the AP on the assumption that a time when STA3 wakes up corresponds to the channel access interval assigned to the group, to which STA3 belongs, according to computation based on the local clock thereof and data to be transmitted thereto is present. Alternatively, since STA3 operates in the long-sleep mode, on the assumption that time synchronization is not performed, if the data to be transmitted thereto is present, STA3 may transmit PS-Poll to the AP in order to receive the data. Since the ACK frame received by STA3 from the AP indicates that data to be transmitted to STA3 is present, STA3 continuously waits for data reception under the assumption of the interval in which channel access thereof is granted. STA3 unnecessarily consumes power even when data reception is not allowed, until time synchronization is appropriately performed from information included in a next beacon frame.

In particular, if STA3 operates in the long-sleep mode, the beacon frame may frequently not be received, CCA may be performed even at the channel access interval, to which STA2 does not belong, thereby causing unnecessary power consumption.

Next, in the example of FIG. 15, the beacon frame is missed when the STA having GID 1 (that is, belonging to group 1) wakes up. That is, the STA which does not receive the beacon frame including the GID (or PID) assigned thereto is continuously in the awake state until the beacon frame including the GID (or PID) thereof is received. That is, although the STA wakes up at channel access interval assigned thereto, the STA cannot confirm whether the GID (or PID) thereof is included in the TIM transmitted via the beacon frame and thus cannot confirm whether the timing corresponds to the channel access interval assigned to the group thereof.

In the example of FIG. 15, the STA which is switched from the sleep state to the awake state is continuously in the awake state until the fourth beacon frame including the GID (that is, GID 1) thereof is received after the first beacon frame has been missed, thereby causing unnecessary power consumption. As a result, after unnecessary power consumption, the STA may receive the beacon frame including GID 1 and then may perform RTS transmission, CTS reception, data frame transmission and ACK reception.

FIG. 16 shows the case in which an STA wakes up at a channel access interval for another group. For example, the STA having GID 3 may wake up at the channel access interval for GID 1. That is, the STA having GID 3 unnecessarily consumes power until the beacon frame having the GID thereof is received after waking up. If a TIM indicating GID 3 is received via a third beacon frame, the STA may recognize the channel access interval for the group thereof and perform data transmission and ACK reception after CCA through RTS and CTS.

3. First Proposed Method for CFO Estimation

As interest in future Wi-Fi and demand for improvement of throughput and QoE (quality of experience) after 802.11ac increase, it is necessary to define a new frame format for future WLAN systems. The most important part in a new frame format is a preamble part because design of a preamble used for synchronization, channel tracking, channel estimation, adaptive gain control (AGC) and the like may directly affect system performance.

In the future Wi-Fi system in which a large number of APs and STAs simultaneously access and attempt data transmission and reception, system performance may be limited when legacy preamble design is employed. That is, if each preamble block (e.g., a short training field (STF) in charge of AGC, CFO estimation/compensation, timing control and the like or a long training field (LTF) in charge of channel estimation/compensation, residual CFO compensation and the like) executes only the function thereof defined in the legacy preamble structure, frame length increases, causing overhead. Accordingly, if a specific preamble block can support various functions in addition to the function designated therefor, an efficient frame structure can be designed.

Furthermore, since the future Wi-Fi system considers data transmission in outdoor environments as well as indoor environments, the preamble structure may need to be designed differently depending on environments. Although design of a unified preamble format independent of environment variation can aid in system implementation and operation, of course, it is desirable that preamble design be adapted to system environment.

Preamble design for efficiently supporting various functions is described hereinafter. For convenience, a new WLAN system is referred to as an HE (High Efficiency) system and a frame and a PPDU (PLCP (Physical Layer Convergence Procedure) Protocol Data Unit) of the HE system are respectively referred to as an HE frame and an HE PPDU. However, it is obvious to those skilled in the art that the proposed preamble is applicable to other WLAN systems and cellular systems in addition to the HE system.

The following table 1 shows OFDM numerology which is a premise of a pilot sequence transmission method described below. Table 1 shows an example of new OFDM numerology proposed in the HE system and numerals and items shown in Table 1 are merely examples and other values may be applied. Table 1 is based on the assumption that FFT having a size four times the legacy one is applied to a given BW and 3 DCs are used per BW.

TABLE 1

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238 | 492 | 1002 | 1002 | 2004 | Number of complex data numbers per frequency segment |
| $N_{SP}$ | 4 | 6 | 8 | 8 | 16 | Number of pilot values per frequency segment |
| $N_{ST}$ | 242 | 498 | 1010 | 1010 | 2020 | Total number of subcarriers per frequency segment. See NOTE. |
| $N_{SR}$ | 122 | 250 | 506 | 506 | 1018 | Highest data subcarrier index per frequency segment |
| $N_{Seg}$ | 1 | 1 | 1 | 2 | 1 | Number of frequency segments |
| $\Delta_F$ | | | 312.5 kHz | | | Subcarrier frequency Spacing for non-HE portion |
| $\Delta_{F\_HE}$ | | | 78.125 kHz | | | Subcarrier frequency Spacing for HE portion |
| $T_{DFT}$ | | | 3.2 μs | | | IDFT/DFT period for non-HE portion |
| $T_{DFT\_HE}$ | | | 12.8 μs | | | IDFT/DFT period for HE portion |
| $T_{GI}$ | | | 0.8 μs = $T_{DFT}/4$ | | | Guard interval duration for non-HE portion |
| $T_{GI\_HE}$ | | | 3.2 μs = $T_{DFT\_HE}/4$ | | | Guard interval duration for HE portion |
| $T_{GI2}$ | | | 1.6 μs | | | Double guard interval for non-HE portion |
| $T_{GIS\_HE}$ | | | 0.8 μs = $T_{DFT\_HE}/16$ [Alternative: 0.4 μs (1/32 CP)] | | | Short guard interval Duration (used only for HE data) |

TABLE 1-continued

| Parameter | CBW20 | CBW40 | CBW80 | CBW80 + 80 | CBW160 | Description |
|---|---|---|---|---|---|---|
| $T_{SYML}$ | | | 4 μs = $T_{DFT}$ + $T_{GI}$ | | | Long GI symbol interval for non-HE portion |
| $T_{SYML\_HE}$ | | | 16 μs = $T_{DFT\_HE}$ + $T_{GI\_HE}$ | | | Long GI symbol interval for HE portion |
| $T_{SYMS\_HE}$ | | | 13.6 μs = $T_{DFT\_HE}$ + $T_{GIS\_HE}$ [Alternative: 13.2 μs (with 1/32 CP)] | | | Short GI symbol interval (used only for HE data) |
| $T_{SYM}$ | | | $T_{SYML}$ or $T_{SYMS}$ depending on the GI used | | | Symbol interval for non-HE portion |
| $T_{SYM\_HE}$ | | | $T_{SYML\_HE}$ or $T_{SYMS\_HE}$ depending on the GI used | | | Symbol interval for HE portion |
| $T_{L\text{-}STF}$ | | | 8 μs = 10 * $T_{DFT}$/4 | | | Non-HE Short Training field duration |
| $T_{L\text{-}LTF}$ | | | 8 μs = 2 × $T_{DFT}$ + $T_{GI2}$ | | | Non-HE Long Training field duration |
| $T_{L\text{-}SIG}$ | | | 4 μs = $T_{SYML}$ | | | Non-HE SIGNAL field duration |
| $T_{HE\text{-}SIGA}$ | | | 12.8 μs = 2($T_{SYML}$ + 3$T_{GI}$) in HE-PPDU format-1 or $T_{SYML\_HE}$ in HE-PPDU format-2 and HE-PPDU format-3 | | | HE Signal A field duration |
| $T_{HE\text{-}STF}$ | | | $T_{SYML\_HE}$ | | | HE Short Training field duration |
| $T_{HE\text{-}LTF}$ | | | $T_{SYML\_HE}$ | | | Duration of each HE LTF symbol |
| $T_{HE\text{-}SIGB}$ | | | $T_{SYML\_HE}$ | | | HE Signal B field duration |
| $N_{service}$ | | | 16 | | | Number of bits in the SERVICE field |
| $N_{tail}$ | | | 6 | | | Number of tail bits per BCC encoder |

NOTE
$N_{ST} = N_{SD} + N_{SP}$

Figure 17:
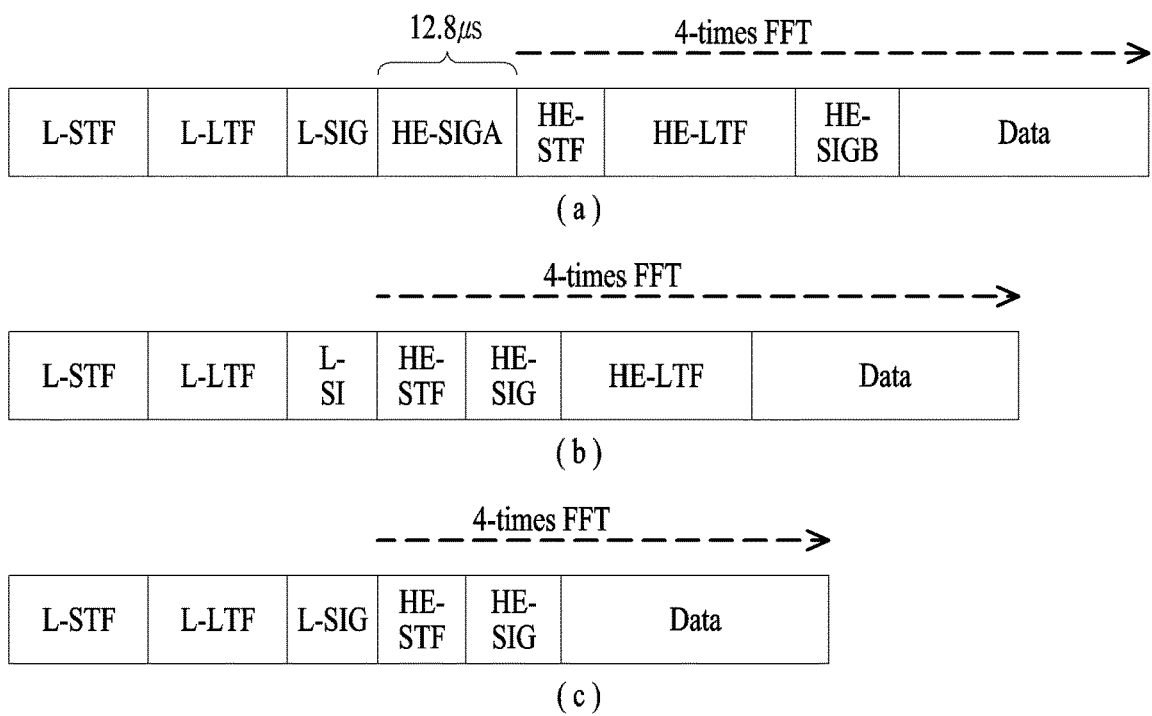

FIG. 17 is a diagram illustrating frame structures related to an embodiment of the present invention. As illustrated in FIGS. 17(a), 17(b) and 17(c), various frame structures can be configured, and a proposed pilot sequence transmission method is related to an HE-STF (High Efficiency Short Training Field) in a preamble in a frame structure.

FIGS. 18 and 19 are diagrams illustrating frame structures according to another embodiment of the present invention and constellations thereof. Specifically, FIG. 18(a) illustrates a time-domain frame structure of a high throughput (HT) system based on 802.11n. In FIG. 18(a), L-SIG and HT-SIG indicates a legacy signal field and a high throughput signal field, respectively. Assuming that one OFDM symbol length is 4 us, the L-SIG corresponds to a single OFDM symbol and the HT-SIG corresponds to two OFDM symbols.

Meanwhile, assuming that data transmission is performed based on the frame structure shown in FIG. 18(a), system information can be mapped to constellations shown in FIG. 18 and then transmitted to a UE.

FIG. 19(a) shows a frame structure of a very high throughput (VHT) system based on 802.11ac. Similar to FIG. 18, in the VHT system, system information is mapped to constellations shown in FIG. 19(b) and then transmitted to a UE using L-SIG and VHT-SIG-A fields shown in FIG. 19(a).

FIG. 20 is a diagram illustrating frequency-domain pilot signals related to the proposed embodiments.

After receiving such fields as L-SIG, HT-SIG, and VHT-SIG-A from a BS (or transmission module) as described with reference to FIGS. 18 and 19, a UE (or reception module) performs Fast Fourier Transform (FFT) operation. The results of the operation can be expressed as shown in FIG. 20.

FIG. 20 shows converted frequency-domain pilot signals in each OFDM symbol. In FIG. 20, a signal received through each subcarrier can be expressed as shown in Equation 1.

$$r_k^n = H_k^n s_k^n \qquad \text{[Equation 1]}$$

In Equation 1, k denotes a subcarrier index and n denotes an OFDM symbol index. In addition, $H_k^n$ indicates a channel between an $n^{th}$ OFDM symbol and a $k^{th}$ subcarrier. Assuming that a data signal transmitted through $H_k^n$ is $s_k^n$, a received signal can be expressed as $r_k$ in Equation 1.

Meanwhile, as shown in FIG. 20, some subcarriers include guard intervals or direct current (DC) components and such carriers are set to null without loading data signals. On the other hand, in case of subcarriers in which data signals are loaded, a set of their indices is defined as C.

Before describing the proposed CFO estimation method, the concept of a CFO is explained hereinbelow. The CFO (carrier frequency offset) occurs due to performance of oscillators included in both a transmission module and a reception module or Doppler effects. The CFO can be divided into an integer part and a fractional part (for example, if the CFO has a value of 2.5, the integer part is 2 and the fractional part is 0.5). A subcarrier is circular shifted by the integer part of the CFO, but the fractional part of the CFO causes interference between subcarriers.

In the HT and VHT systems, a reception module estimates a CFO value using an L-STF field and an L-LTF field. After the CFO estimation, the estimated result is applied to a received OFDM symbol. By doing so, the effect of the CFO is eliminated as shown in Equation 2.

$$D(-\hat{\epsilon})y = D(-\hat{\epsilon})(D(\epsilon)x + n) \quad \text{[Equation 2]}$$
$$= D(\epsilon - \hat{\epsilon})x + n'$$
$$= D(\Delta\epsilon)x + n'$$

In Equation 2, $\epsilon$ indicates an actual CFO value and $\hat{\epsilon}$ indicates an estimated CFO value. In addition, y indicates a received signal vector when the CFO is present, x indicates a received signal vector when the CFO is not present, and n indicates a noise vector. A diagonal matrix D of Equation 2 is defined as shown in Equation 3.

$$D(\epsilon) = \begin{bmatrix} 1 & 0 & & 0 \\ 0 & e^{j2\pi\epsilon/N} & \ddots & \\ & \ddots & \ddots & 0 \\ 0 & & 0 & e^{j2\pi\epsilon(N-1)/N} \end{bmatrix} \quad \text{[Equation 3]}$$

If the reception module perfectly estimates the CFO value using the L-SFT and the L-LTF ($\epsilon=\hat{\epsilon}$), the reception module can perfectly eliminate the CFO from the received signal using Equation 2 and Equation 3 ($\Delta\epsilon=0$). However, since the CFO is slightly changed depending on time, it is difficult to perfectly estimate the CFO value ($\epsilon \ne \hat{\epsilon}$). Thus, a residual CFO can be defined as shown in Equation 4.

$$\Delta\epsilon = \epsilon - \hat{\epsilon} + \tilde{\epsilon} \quad \text{[Equation 4]}$$

In Equation 4, $\tilde{\epsilon}$ indicates a CFO value changed depending on time. To re-estimate the residual CFO, the reception module utilizes pilot signals included in the L-SIG and HT-SIG. In the HT system, the residual CFO is estimated using four pilot signals. However, since the HT system has a relatively small number of pilot signals, performance of the CFO estimation is significantly decreased in case of a low SNR. That is, the number of pilot signal needs to be increased to overcome such a problem but it may cause throughput reduction as a trade-off. Therefore, a CFO estimation method for minimizing performance degradation in case of a low SNR while maintaining an HT system structure needs to be developed.

Hereinafter, a CFO method according to the present invention will be described with reference to FIGS. 21 to 23. According to proposed embodiments, the reception module can estimate the CFO in a blind manner, i.e., using a data signal instead of a pilot signal.

Figure 21:
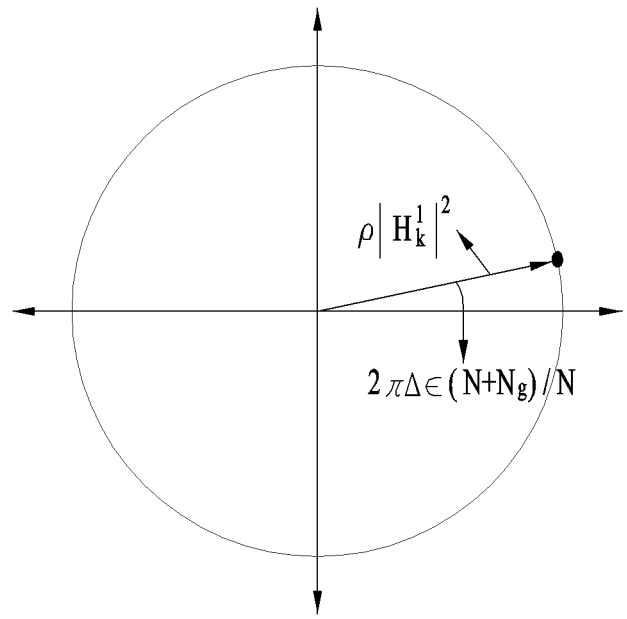
FIGS. 21 and 22 are diagrams for explaining a CFO estimation method according to the present invention.
Figure 22:
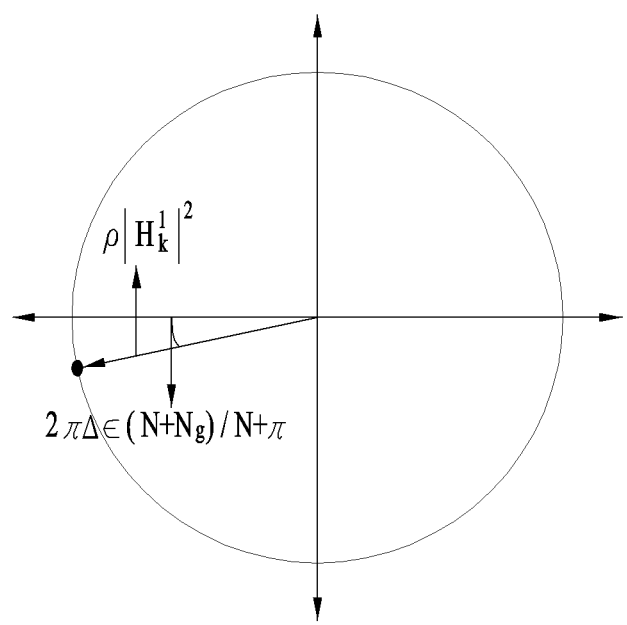

FIGS. 21 and 22 are diagrams for explaining a proposed CFO estimation method. In FIGS. 21 and 22, it is assumed that data transmission is performed according to a binary phase shift keying (BPSK) scheme or a quadrature phase shift keying (QBPSK) scheme.

According to the proposed CFO estimation method, $y_k^n$, which reflects a received signal in two consecutive OFDM symbols based on Equation 1, can be defined as shown in Equation 5.

$$y_k^n \triangleq r_k^{n+1}(r_k^n)^*, k \in C, n=1, 2, \ldots, L \quad \text{[Equation 5]}$$

In Equation 5, L is defined as (the number of total OFDM symbols to which the proposed CFO estimation method is applied−1). For example, when two OFDM symbols are used as shown in FIG. 20, L is set to 1. When three OFDM symbols are used for the L-SIG and the HT-SIG shown in FIG. 18(a), L is set to 3.

Hereinafter, Equation 5 is described in detail. In the case of two consecutive OFDM symbols (i.e., $n^{th}$ OFDM symbol and $(n+1)^{th}$ OFDM symbol), a channel is not rapidly changed. In other words, in Equation 5, $y_k^n$ is defined on the assumption that the two consecutive OFDM symbols have the same channel.

According to the proposed CFO estimation method, a process shown in Equation 6 below is performed after calculation of $y_k^n$.

$$z_k^n = \begin{cases} y_k^n & \text{if } \text{real}(y_k^n) \ge 0 \\ -y_k^n & \text{if } \text{real}(y_k^n) < 0 \end{cases} \quad \text{[Equation 6]}$$

In Equation 6, $z_k^n$ is determined by a sign of a real part of $y_k^n$. In addition, Equation 7 below shows a process for determining a final residual CFO.

$$\Delta\hat{\epsilon} = \text{angle}\left(\sum_{n=1}^{L}\sum_{k \in C} z_k^n\right) \times \frac{N}{2\pi(N+N_g)} \quad \text{[Equation 7]}$$

In equation 7, $\Delta\hat{\epsilon}$ indicates a finally calculated residual CFO value, and N and $N_g$ indicate an OFDM symbol length and a cyclic prefix (CP) length, respectively. It can be seen from Equation 7 that the processes described in Equation 5 and Equation 6 are performed with respect to the entirety of the set C consisting of subcarriers where data are loaded.

Hereinafter, processes for Equations 5 to 7 are described in detail. Assuming that n is equal to 1 in Equation 5, $y_k^1$ can be expressed as shown in Equation 8.

$$y_k^1 \triangleq r_k^2(r_k^1)^* \quad \text{[Equation 8]}$$
$$\approx H_k^2 s_k^2 (H_k^1 s_k^1)^* e^{j2\pi\Delta\epsilon(N+N_g)/N}$$
$$= H_k^2 (H_k^1)^* s_k^2 (s_k^1)^* e^{j2\pi\Delta\epsilon(N+N_g)/N}$$
$$\approx \rho |H_k^1|^2 \text{sign}(s_k^2(s_k^1)^*) e^{j2\pi\Delta\epsilon(N+N_g)/N}$$

In Equation 8, $\rho$ indicates a power component of the data signal $s_k^n$. In addition, a function sign(a) has a value of 1 when a variable a has a positive sign and a value of −1 when the variable a has a negative sign. Meanwhile, approximation in the second line of Equation 8 is achieved based on the assumption that interference between subcarriers caused by the residual CFO can be ignored. Moreover, approximation in the fourth line is achieved on the assumption that channels $H_k^1$ and $H_k^2$ in the two OFDM symbols are equal to each other. Considering that the BPSK scheme is applied together with the above assumptions, an equation of $s_k^2(s_k^1)^* = \rho \text{sign}(s_k^2(s_k^1)^*)$ is always satisfied.

In Equation 8, when an equation of $\rho \text{sign}(s_k^2(s_k^1)^*) = \rho$ is satisfied, $y_k^1$ is defined as shown in Equation 9.

$$y_k^1 \approx \rho |H_k^1|^2 e^{j2\pi\Delta\epsilon(N+N_g)/N} \quad \text{[Equation 9]}$$

Referring to FIG. 21, it can be seen that a component $\rho |H_k^1|^2$ corresponds to a radio of the illustrated circle and a component $2\pi\Delta\epsilon(N+N_g)/N$ corresponds to a phase value of the illustrated point. In this case, a phase value of $y_k^1$ is a function of the residual CFO ($\Delta\hat{\epsilon}$) and the value is proportional to the residual CFO value. For example, if the residual CFO value is 0, the phase of $y_k^1$ is also 0. If the phase of $y_k^1$ is smaller than $2\pi$, a ratio of the residual CFO to the phase of $y_k^1$ is 1:1. Thus, it is possible to estimate the residual CFO value from the phase of $y_k^1$.

On the other hand, when an equation of $\rho\text{sign}(s_k^2(s_k^1)^*)=-\rho$ is satisfied, Equation 9 is expressed as shown in Equation 22 instead of Equation 21. If the reception module is aware of $\rho\text{sign}(s_k^2(s_k^1)^*)=-\rho$, the reception module can estimate the residual CFO from the phase of $y_k^1$ through a simple calculation. However, such a calculation is disadvantageous in that the reception module should know received data before performing the calcualtion. Moreover, according to the proposed CFO method, since the CFO estimation is performed in a blind manner without the use of a pilot signal, whether a value of $\text{sign}(s_k^2(s_k^1)^*)$ is positive or negative should be first determined to accurately estimate the residual CFO.

To solve the above-mentioned problem, a case where the residual CFO value is relatively small compared to the total CFO is considered. In other words, first of all, the reception module may estimate the CFO value using a preamble part such as the L-STF and the L-LTF and then estimate the residual CFO value based on the L-SIG and the HT-SIG. When the CFO value is approximately estimated through the primary CFO estimation process as described above, a phase of the residual CFO has a relatively small value and thus, a range of the phase of $y_k^1$ also does not have a large value. Accordingly, Equation 10 can be deduced as follows.

$$\text{sign}(s_k^2(s_k^1)^*)=1 \text{ if angle}(y_k^1)\in\{\text{first quadrant, fourth quadrant}\}$$

$$\text{sign}(s_k^2(s_k^1)^*)=-1 \text{ if angle}(y_k^1)\in\{\text{second quadrant, third quadrant}\} \quad \text{[Equation 10]}$$

If the phase of $y_k^1$ belongs to the first quadrant or the fourth quadrant, the equation of $\rho\text{sign}(s_k^2(s_k^1)^*)=\rho$ is satisfied. On the contrary, if the phase of $y_k^1$ belongs to the second quadrant or the third quadrant, the equation of $\rho\text{sign}(s_k^2(s_k^1)^*)=-\rho$ is satisfied. That is, Equation 6 can be explained by Equation 10, i.e., a residual CFO relationship. In other words, according to Equation 6, in the case of $\rho\text{sign}(s_k^2(s_k^1)^*)=-\rho$, the phase of $y_k^1$ is changed by $\pi$.

Meanwhile, when there is no noise, all phases of $z_k^1$, $k\in C$, which are calculated according to Equation 6, have values of $2\pi\Delta\in(N+N_g)/N$. That is, calculation results of all subcarriers are in a state of in-phase (or co-phase). According to Equation 7, the residual CFO can be accurately estimated when there is noise. In Equation 7, the phase and power of the signal are added all together, a robust result with respect to a dominant noise can be obtained.

According to the above-described method, the total CFO can be accurately measured by estimating the residual CFO in a blind manner In addition, even when the SNR/SINR is low, overhead due to transmission of an additional pilot signal does not occur and thus, communication can be efficiently performed.

Meanwhile, according to an embodiment of the present invention, the CFO method can be applied to a subset C' of the subcarrier set C where data is loaded. That is, although it can be seen in Equation 7 that the process for estimating the residual CFO is performed by adding phases of all samples, the residual CFO can be estimated using only some subcarriers instead of the total subcarrier samples. Accordingly, a subset of the set C where data signals are loaded is defined as the subset C' and then the set C can be substituted with the subset C' in Equation 7.

When a specific subcarrier is significantly faded, a size of data received through the corresponding subcarrier is also significantly decreased. In this case, compared to other data samples, the corresponding data sample is rarely attributed to the residual CFO estimation. In other words, the residual CFO can be estimated using only relatively large sizes of data samples. In addition, even if small sizes of samples are excluded, it does not cause performance degradation.

According to an embodiment generated by modifying the above-described embodiment, if the reception module knows sizes of data signals received through respective subcarriers, the reception module can arrange the subcarriers in descending order of sizes and then define subcarriers with sizes greater than a threshold as the subset C'. According to this embodiment, since the reception module may skip the processes described in Equations 5 to 7 (i.e., complexity associated with the processes described in Equations 5 to 7 may be reduced), performance degradation in the residual CFO estimation can also be minimized.

The present invention has been described with reference to cases where either the BPSK scheme or the QBPSK scheme is applied. However, the invention can be applied to a case where the BPSK scheme and the QBPSK scheme is alternately applied to each OFDM symbol. However, when two consecutive OFDM symbols are mapped to different constellations, the proposed method cannot be applied as it is because a product of two signal is not 1 or −1.

In this case, the residual CFO can be estimated according to Equation 11.

$$y_k^n \triangleq \tilde{r}_k^{n+1}(\tilde{r}_k^n)^*, k \in C, n = 1, 2, \ldots, L \quad \text{[Equation 11]}$$

$$\tilde{r}_k = \begin{cases} r_k e^{-j\pi/2} & \text{if } s_k \text{ is } QBPSK \\ r_k & \text{otherwise} \end{cases}$$

Equation 5 can be substituted with Equation 11. In Equation 11, a phase of a signal received in the OFDM symbol where the QBPSK scheme is used is shifted by $e^{-j\pi/2}$ but a phase of a signal received in the OFDM symbol where the BPSK scheme is used is not shifted. According to Equation 11, when the BPSK and QBPSK are alternately used in a series of OFDM symbols, it is possible to obtain the same results as those in Equations 6 and 7.

Figure 23:
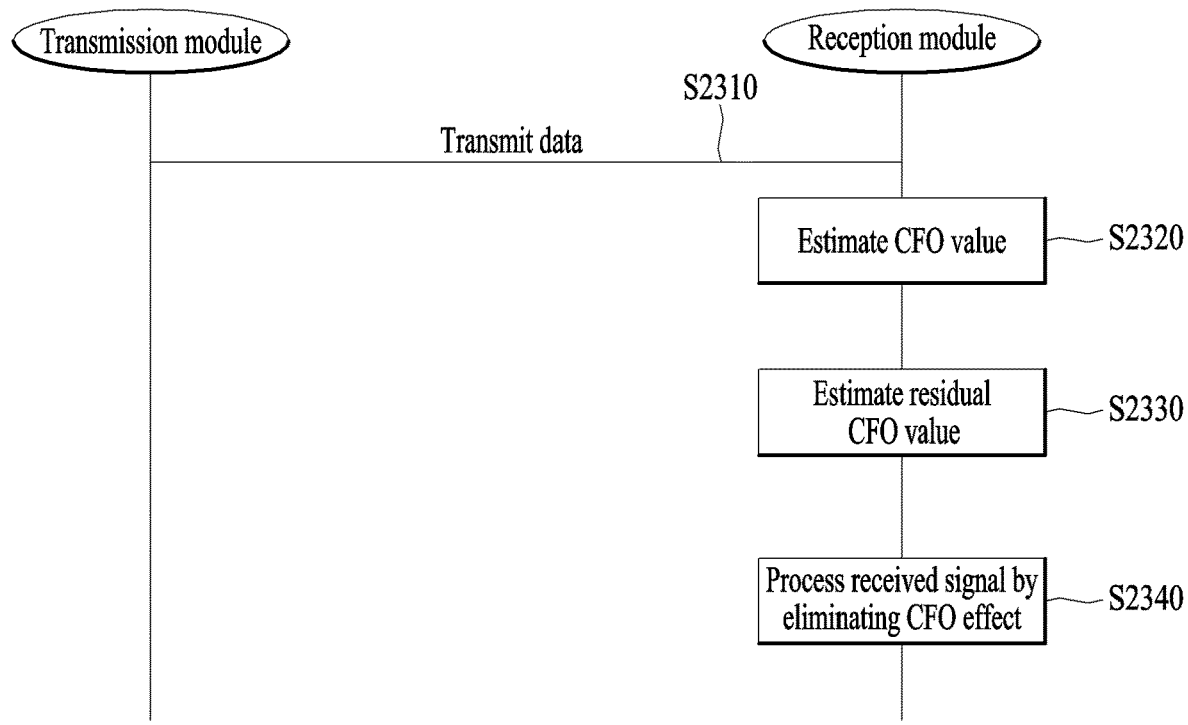
FIG. 23 is a flowchart illustrating a CFO estimation method according to the present invention.

FIG. 23 is a flowchart for explaining the proposed CFO estimation method. Specifically, FIG. 23 shows a time series flow of the CFO estimation method according to the aforementioned embodiments. Thus, it is apparent that although the aforementioned features described with reference to FIGS. 18 to 22 are not explicitly shown and described in FIG. 23, the features can be applied to the flowchart in FIG. 23 in the same or similar manner.

First, a transmission module transmits data to a reception module S2310. In this case, data is transmitted in a unit of frame, which is defined by an OFDM symbol and a subcarrier. In addition, the data is mapped to a specific constellation and then transmitted to the reception module. As such as a constellation, either BPSK or QBPSK may be used. Alternatively, the BPSK and QBPSK may be alternately used in a series of consecutive OFDM symbols.

Meanwhile, the reception module primarily estimate a CFO value based on a received signal [S2320]. Such a process is performed using a preamble part such as an L-STF, an L-LTF, and the like. However, since a CFO is changed depending on time, the CFO value estimated in the step S2320 may be inaccurate.

Therefore, the reception module estimates a residual CFO value to compensate the primarily estimated CFO value

[S2330]. As described above, the reception module estimates the residual CFO value on the assumption that channels of received signals in two consecutive OFDM symbols are equal to each other. Specifically, the reception module calculates a product of the two received signal and then checks a sign of a real part of the product based on the assumption that the residual CFO value is smaller than the primarily estimated CFO value. If total subcarriers are in a state of in-phase, the reception module can obtain the residual CFO from a phase value calculated by adding results of all subcarriers.

Finally, the reception module can accurately decode the data transmitted from the transmission module by eliminating effects of the CFO estimated in the step S2320 and the residual CFO estimated in the step S2330 from the received signal.

4. Second Proposed Method for CFO Estimation

Figure 24:
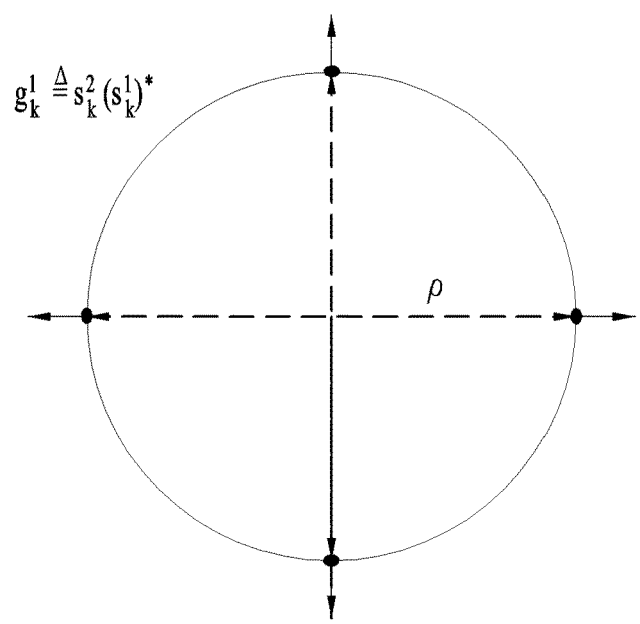
FIGS. 24 to 26 are diagrams for explaining a CFO estimation method according to the present invention.
Figure 25:
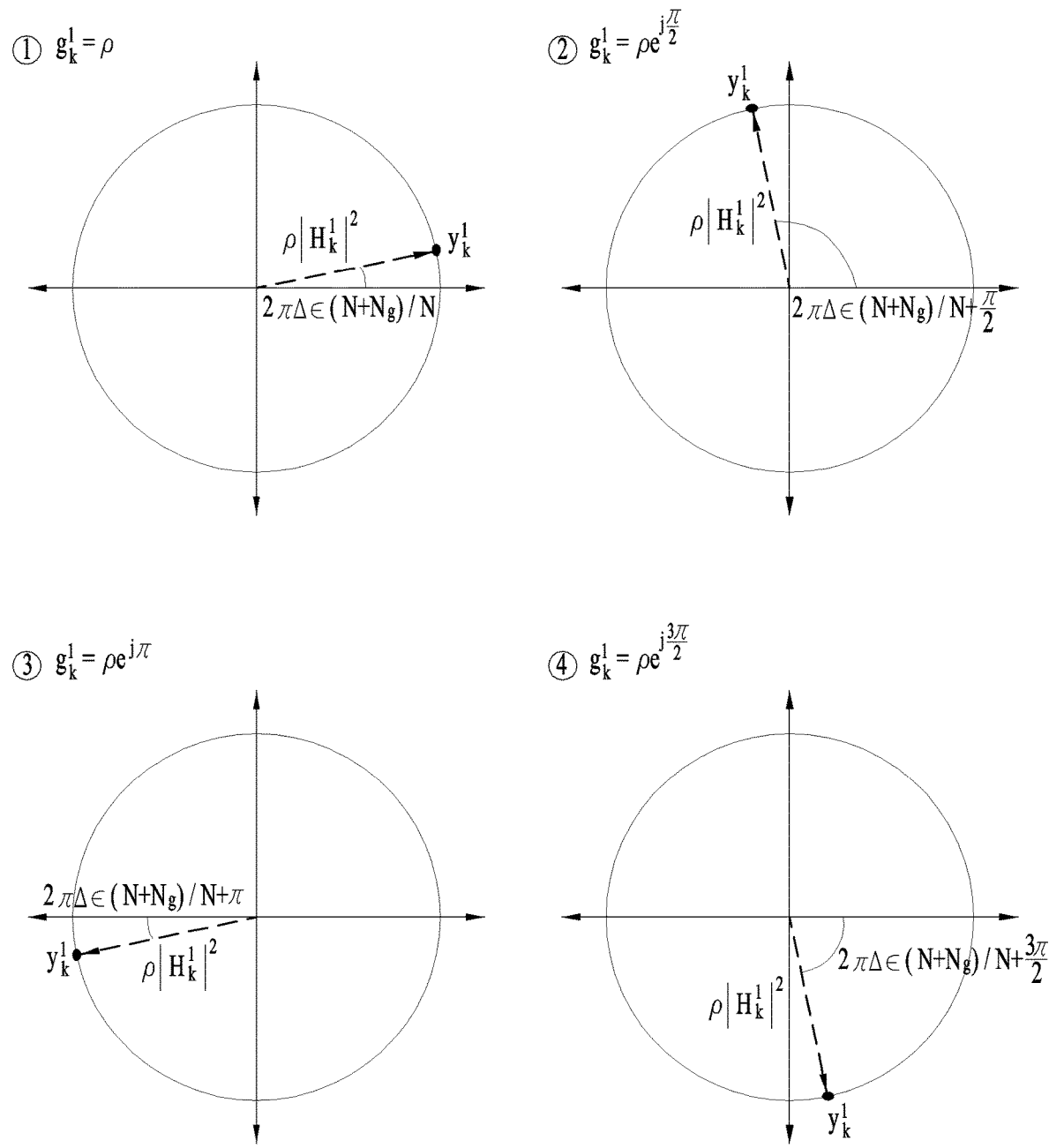
Figure 26:
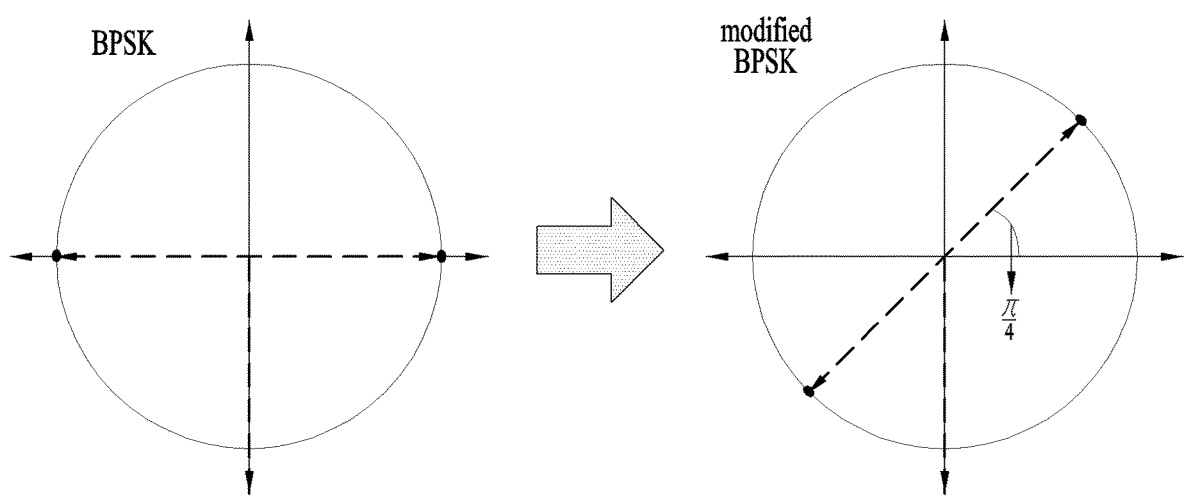

FIGS. 24 to 26 are diagrams illustrating a CFO estimation method according to a proposed embodiment. That is, the CFO estimation method when the BPSK and/or QBPSK scheme is used has been described above. Next, a description will be given of a CFO estimation method when data is transmitted using a quadrature phase shift keying (QPSK) scheme.

Similar to the process described in Equation 5, $y_k^n$, which reflects signals received in two consecutive OFDM symbols based on Equation 1, can be defined as shown in Equation 12.

$$y_k^n \triangleq r_k^{n+1}(r_k^n)^*, k \in C, n=1, 2, \ldots, L \qquad [\text{Equation 12}]$$

In Equation 12, L is defined as (the number of total OFDM symbols to which the proposed CFO estimation method is applied−1). For example, when two OFDM symbols are used as shown in FIG. 20, L is set to 1 (L=1). When three OFDM symbols are used similar to the L-SIG and the HT-SIG of FIG. 18(a), L is set to 3 (L=3).

Hereinafter, Equation 12 is described in detail. In the case of two consecutive OFDM symbols (i.e., $n^{th}$ OFDM symbol and $(n+1)^{th}$ OFDM symbol), a channel is not rapidly changed. In other words, in Equation 12, $y_k^n$ is defined on the assumption that the two consecutive OFDM symbols have the same channel.

Thereafter, if $y_k^n$ is calculated at a reception module, a calculation can be performed as shown in Equation 12 below.

$$z_k^n = \begin{cases} y_k^n & \text{if } \text{real}(y_k^n) \geq 0, \text{real}(y_k^n) \geq \text{imag}(y_k^n) \\ -y_k^n & \text{if } \text{real}(y_k^n) < 0, \text{real}(y_k^n) \geq \text{imag}(y_k^n) \\ -j \times y_k^n & \text{if } \text{imag}(y_k^n) \geq 0, \text{real}(y_k^n) < \text{imag}(y_k^n) \\ j \times y_k^n & \text{if } \text{imag}(y_k^n) < 0, \text{real}(y_k^n) < \text{imag}(y_k^n) \end{cases} \qquad [\text{Equation 13}]$$

In equation 13, $Z_k^n$ is determined by signs and magnitudes of a real part and an imaginary part of $y_k^n$. Although details will be described later, the four different cases in Equation 13 may respectively correspond to four different quadrants of the constellation. Thus, the function $Z_k^n$ can be generated in different ways as shown in Equation 13 depending on a quadrant to which $y_k^n$ belongs.

Next, Equation 14 shows a process for determining a final residual CFO based on Equation 13.

$$\Delta \hat{\epsilon} = \text{angle}\left(\sum_{n=1}^{L}\sum_{k \in C} z_k^n\right) \times \frac{N}{2\pi(N+N_g)} \qquad [\text{Equation 14}]$$

In Equation 14, $\Delta\hat{\epsilon}$ indicates a final residual CFO value calculated at a reception module, and N and $N_g$ indicate an OFDM symbol length and a cyclic prefix (CP) length, respectively. It can be seen from Equation 14 that the processes described in Equation 12 and Equation 13 are performed with respect to the entirety of the set C consisting of subcarriers where data are loaded.

Hereinafter, details of the processes in Equations 12 to 14 are described. First, $y_k^1$ can be expressed as shown in Equation 15 according to the approximation procedure mentioned in Equation 8

$$y_k^1 \approx |H_k^1|^2 s_k^2(s_k^1)^* e^{j2\pi\Delta\hat{\epsilon}(N+N_g)/N} \qquad [\text{Equation 15}]$$

When data transmission is performed using the QPSK scheme, $s_k^2(s_k^1)^*$ can be distributed to one of the four points shown in FIG. 24. In other words, a phase of the product of data transmitted in the two consecutive OFDM symbols may be one of the four points of the constellation shown in FIG. 24. Meanwhile, in FIG. 24, the value of $s_k^2(s_k^1)^*$ is defined as $g_k^1$ according to Equation 16.

$$g_k^1 = s_k^2(s_k^1)^* \qquad [\text{Equation 16}]$$

It can be seen from FIG. 24 that a phase of $g_k^1$ is one of $\{0, \pi/2, \pi, \pi/3\}$.

Meanwhile, if a residual CFO value to be measured at the reception module is relatively smaller than a total CFO value, $y_k^1$ may have values shown in FIG. 25. That is, the residual CFO has a relatively smaller value than a CFO value firstly estimated based on the preamble part. Thus, it can be known that the phase of the function $y_k^1$ used for residual CFO estimation does not have a relatively large value. Further, the phase of $y_k^1$ may have values that are not significantly different from phase values at the four points of the QPSK constellation.

If the assumption that the residual CFO has a relatively small value is not established, a phase ambiguity problem may occur while the residual CFO is measured. However, based on the aforementioned assumption, it can be seen that the phase change of $y_k^1$ due to the residual CFO is within the range of $\{0, \pi/2\}$ (i.e., the first embodiment of FIG. 25), $\{\pi/2, \pi\}$ (i.e., the second embodiment of FIG. 25), $\{\pi, 3\pi/2\}$ (the third embodiment of FIG. 25), or $\{3\pi/2, 2\pi\}$ (the fourth embodiment of FIG. 25).

Equation 17 can be deduced based on the above results.

$$y_k^1 \Rightarrow \begin{cases} ① & \text{if real }(y_k^1) \geq 0, \text{real }(y_k^1) \geq \text{imag }(y_k^1) \\ ③ & \text{if real }(y_k^1) < 0, \text{real }(y_k^1) \geq \text{imag }(y_k^1) \\ ② & \text{if imag }(y_k^1) \geq 0, \text{real }(y_k^1) < \text{imag }(y_k^1) \\ ④ & \text{if imag }(y_k^1) < 0, \text{real }(y_k^1) < \text{imag }(y_k^1) \end{cases} \qquad [\text{Equation 17}]$$

That is, it is possible to obtain a quadrant to which $y_k^1$ belongs among the four quadrants of the constellation by comparing/analyzing a real part and an imaginary part of $y_k^1$ according to Equation 17. For example, when $y_k^1$ satisfies the condition of real($y_k^1$)≥0, real($y_k^1$)≥imag($y_k^1$), $y_k^1$ corresponds to the first embodiment of FIGS. 17 and 25 (i.e., $g_k^1=\rho$). Consequently, when the reception module fails to decode data of $y_k^1$ correctly, it is possible to estimate the phase of $g_k^1$ from the phase of $y_k^1$. In other words, in this case, even though the CFO is estimated in a blind decoding manner, the phase ambiguity problem does not occur.

Meanwhile, after a case to which $y_k^1$ belongs among the four cases is confirmed, the function $Z_k^n$ can be generated through processing of $y_k^n$ as shown in Equation 13. Since all values of $Z_k^n$ is in a state of in-phase (or co-phase), the final residual CFO can be estimated based on the generated $Z_k^n$ and FIG. 14.

Meanwhile, according to the proposed embodiment, as $|H_k^1|^2$ decreases and the residual CFO decreases, the accuracy of the residual CFO estimation can be improved because noise effects can be eliminated from the final residual CFO.

According to another proposed embodiment, the BPSK and the QPSK can be alternately used in a series of OFDM symbols. That is, similar to the case in which the BPSK scheme and the QBPSK scheme are alternately used, the BPSK and the QPSK can be alternately used in two OFDM symbols. However, in this case, since the phase of the product of two received signals is not placed at one of the four points shown in FIG. 24, the aforementioned method cannot be applied as it is.

In this case, the residual CFO can be estimated according to Equation 18.

$$y_k^n \triangleq \tilde{r}_k^{n+1}(\tilde{r}_k^n)^*, k \in C, n = 1, 2, \ldots, L \quad \text{[Equation 18]}$$

$$\tilde{r}_k^l = \begin{cases} r_k^l e^{j\frac{\pi}{4}} & \text{if } BPSK \\ r_k^l & \text{otherwise} \end{cases}$$

Equation 18 can be used instead of Equation 12. According to Equation 18, a phase of a signal received in the OFDM symbol where the BPSK is used can be uniformly changed by π/4. In this case, as shown in FIG. 26, a constellation of the BPSK of which the phase is changed partially matches that of the QPSK. Thus, the aforementioned embodiments can be equally applied to processes after Equation 18.

Meanwhile, in this embodiment, an angle for the phase change can be defined as $$\alpha\frac{\pi}{4}, (\alpha = 2n + 1, n \in \mathbb{Z})$$

(where $\mathbb{Z}$ is a set of integers). That is, it is meaningful that the BPSK constellation is changed as a part of the QPSK constellation and a changed phase value may be different. Moreover, according to the aforementioned embodiments, phase values of $r_k^1$ in all OFDM symbols where the BPSK is used can be uniformly changed by $$\alpha\frac{\pi}{4}, (\alpha = 2n + 1, n \in \mathbb{Z}).$$

However, even when the phases of $r_k^l$ are rotated using different values, the result may be the same as the above result. For instance, when a phase value of $r_1^l$ is rotated by π/4 and a phase value of $r_2^l$ is rotated by 3π/4, the result may be the same as that of the case in which two received signals are rotated by the same phase value according to Equation 18. This is because points of the BPSK constellation is simply moved to points of the QPSK constellation.

The aforementioned embodiment can be equally applied to a case where the QBPSK and the QPSK are alternately used in each OFDM symbol. That is, when the QBPSK and the QPSK are used in two consecutive OFDM symbols, the aforementioned CFO estimation procedure can be equally applied by changing a phase value of a symbol where the QBPSK is used instead of the BPSK.

According to a further embodiment, when the BPSK and QPSK is used in a series of OFDM symbols, Equation 19 can be used instead of Equation 12.

$$y_k^n \triangleq r_k^{n+1}(r_k^n)^* e^{j\frac{\pi}{4}}, k \in C, n = 1, 2, \ldots, L \quad \text{[Equation 19]}$$

Unlike Equation 18, according to Equation 19, the entire phase of $y_k^n$ is changed by π/4 instead of changing phases of individual OFDM symbols. Equation 19 can be satisfied irrespective of whether the BPSK and the QPSK is used for an $n^{th}$ OFDM symbol. This is because the BPSK and the QPSK are alternately used in every two consecutive OFDM symbols. Thus, it is possible to obtain the same result as that of Equation 18.

In Equation 19, even when phases of $y_k^n$ are rotated by different values, the same result occurs. For example, when a phase of $y_1^n$ is rotated by π/4 and a phase of $y_2^n$ is rotated by 3π/4, the same result occurs. In addition, the embodiment described with reference to Equation 19 can be equally applied to not only the case where the BPSK and the QPSK are alternately used in every two OFDM symbols but also the case where the QBPSK and the QPSK are alternately used in every two OFDM symbols.

Hereinafter, a description will be given of UE's operation related to the aforementioned embodiments. First, while data transmitted from a transmission module is received at a reception module, a CFO occurring in an $n^{th}$ OFDM symbol is defined as $\in_n$. To eliminate the CFO in the $n^{th}$ time-domain OFDM symbol and a CFO in an $(n+1)^{th}$ time-domain OFDM symbol, the reception module estimates CFO(s) using a preamble part of a firstly received frame. The estimated CFO is defined as $\hat{\in}_n$. However, since the primarily estimated CFO is not complete (i.e., $\in_n \neq \hat{\in}_n$), there must be a residual CFO ($\Delta\hat{\in}_n$). Thus, the reception module can estimate the residual CFO using the aforementioned embodiments independently or any combination thereof.

After estimating the residual CFO, the reception module can correct a phase of a signal $r_k^l$ received in a subcarrier k as shown in Equation 20 to eliminate the effect of the estimated residual CFO from the received signal.

$$\tilde{r}_k^l = r_k^l e^{-j2\pi\Delta\hat{\in}(N+N_g)/N}, l=n,n+1 \quad \text{[Equation 20]}$$

By doing so, the reception module can compensate phase distortion in the received signal due to the residual CFO and thus, reception SINR can finally be improved.

Meanwhile, unlike a method of eliminating a CFO in the time domain, according to the method of eliminating a CFO in the frequency domain, it is impossible to cancel the effect of a leak signal which occurs due to the CFO. Therefore, to eliminate the CFO effects from $(n+2)^{th}$ and $(n+3)^{th}$ time-domain OFDM symbols, a CFO estimation value shown in Equation 21 can be used.

$$\hat{\in}_{n+2} = \hat{\in}_n + \Delta\hat{\in}_n \quad \text{[Equation 21]}$$

In Equation 21, since $\hat{\in}_{n+2}$ is closer to $\in_{n+2}$ than $\hat{\in}_n$, there may be a smaller residual CFO. Thus, a frequency-domain received signal may have less signal leakage after FFT operation and thus efficiency can be improved in terms of a reception SNR. Next, $\Delta\hat{\in}_{n+2}$ is estimated using the proposed embodiments and then the phase of the signal received in the subcarrier can be corrected as described in Equation 20.

Figure 27:
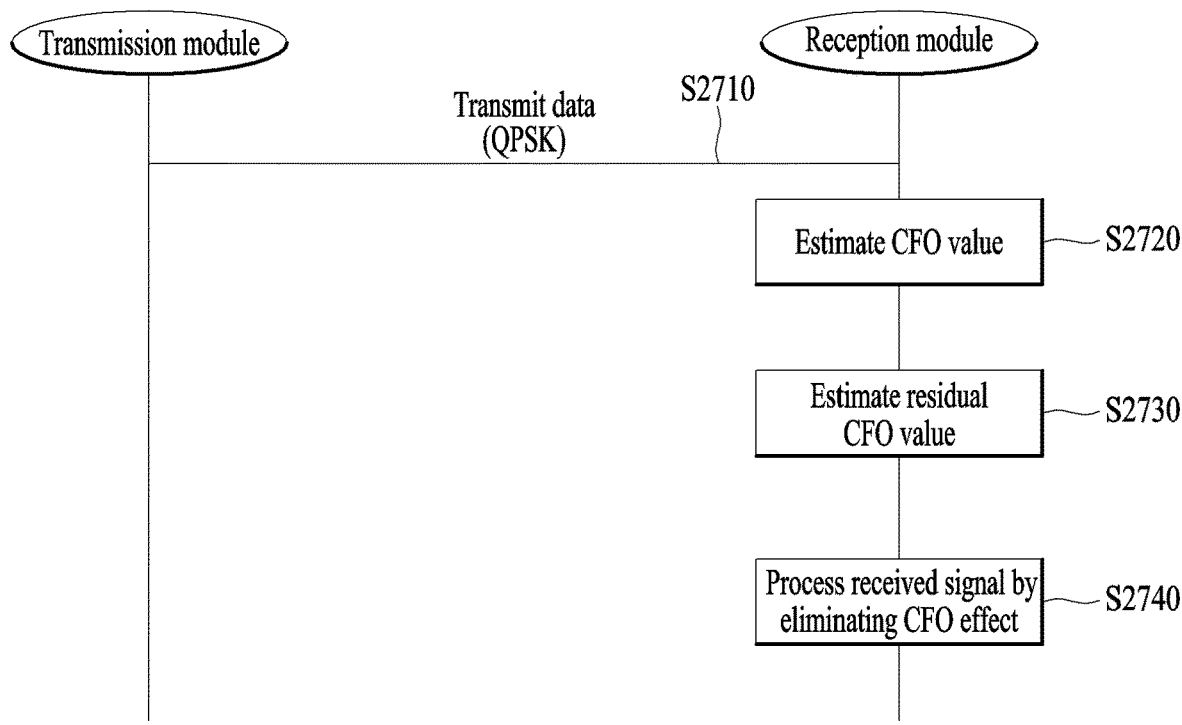
FIG. 27 is a flowchart illustrating a CFO estimation method according to the present invention.

FIG. 27 is a flowchart illustrating the CFO estimation method according to the proposed embodiment. Specifically, FIG. 27 shows a time series flow of the CFO estimation method according to the embodiments described with reference to FIGS. 24 to 26. Thus, it is apparent that although the aforementioned features described with reference to FIGS. 18 to 22 are not explicitly shown and described in FIG. 23, the features can be applied to the flowchart in FIG. 23 in the same or similar manner. Thus, it is apparent that although the aforementioned features described with reference to FIGS. 24 to 26 are not explicitly shown and described in FIG. 27, the features can be applied in the same or similar manner.

First, a transmission module transmits data to a reception module S2710. In this case, data is transmitted in a unit of frame, which is defined by an OFDM symbol and a subcarrier. In addition, the data is mapped to a specific constellation and then transmitted to the reception module. As such as a constellation, the QPSK can be used. Moreover, the BPSK (or QBPSK) and the QPSK can be alternately used in a series of consecutive OFDM symbols.

Meanwhile, the reception module primarily estimate a CFO value based on a received signal [S2720]. Such a process is performed using a preamble part such as an L-STF, an L-LTF, and the like. However, since a CFO is changed depending on time, the CFO value estimated in the step S2720 may be inaccurate.

Therefore, the reception module estimates a residual CFO value to compensate the primarily estimated CFO value [S2730]. As described above, the reception module estimates the residual CFO value on the assumption that channels of received signals in two consecutive OFDM symbols are equal to each other. Specifically, the reception module calculates a product of the two received signal and then checks signs and magnitudes of a real part and an imaginary part of the product based on the assumption that the residual CFO value is smaller than the primarily estimated CFO value. If signals received in the total subcarriers are in a state of in-phase, the reception module can obtain the residual CFO from a phase value calculated by adding results of all the subcarriers.

Finally, the reception module can accurately decode the data transmitted from the transmission module by eliminating effects of the CFO estimated in the step S2720 and the residual CFO estimated in the step S2730 from the received signal.

5. Third Proposed Method for CFO Estimation

Hereinabove, the description has been given of the CFO estimation method for a reception module when data is transmitted using BPSK (QBPSK) or QPSK. According to the above embodiments, if a value of the residual CFO is relatively smaller than that of the primarily estimated CFO, a reception module can operate efficiently. However, when the residual CFO is estimated in a blind manner as described above, the reception module may not determine that the residual CFO value is sufficiently small. Hereinafter, a description will be given of a CFO estimation method for a received in the case of a large residual CFO value.

Figure 28:
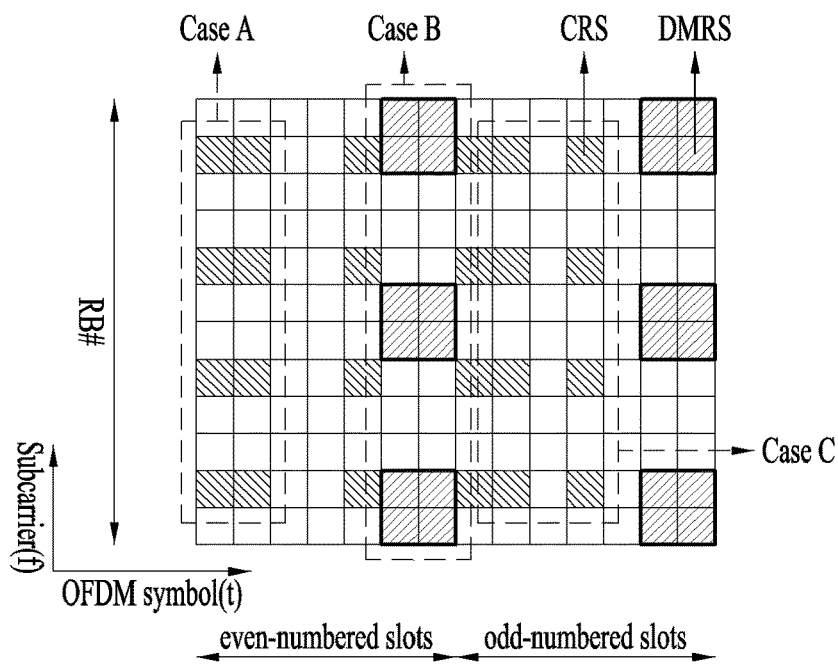
FIG. 28 is a diagram illustrating a resource block according to the present invention.

The CFO estimation method for the reception module can be divided into four steps and each step will be described with reference to FIGS. 28 and 29. Specifically, FIG. 28 is a diagram illustrating a resource block (RB) for the proposed embodiment, which is configured with a plurality of resource elements (REs) defined in the long term evolution (LTE)/LTE-Advanced (LTE-A). Referring to FIG. 28, one RB is defined by 14 OFDM symbols which are arranged on the horizontal axis and 12 subcarriers which are arranged on the vertical axis, that is, the single RB includes a total of 168 REs.

In FIG. 28, a hatched RE indicates a reference signal (RS). Specifically, an RE hatched from top left to bottom right indicates a cell-specific RS (CRS) and an RE hatched from top right to bottom left indicates a demodulation RS (DMRS). Such RSs are known to a reception module in advance and the reception module determines channel state information (CSI) or performs channel estimation for demodulation using theses RSs.

According to the proposed embodiments, a reception module primarily estimates a residual CFO using a RS (hereinafter, the residual CFO is referred to as a first residual CFO). When the reception module cannot obtain a total residual CFO value, the reception module can adjust the residual CFO value to be small by compensating received data using the primarily estimated residual CFO. Thereafter, the reception module estimates the residual CFO according to the aforementioned CFO estimation method 1 or 2 (hereinafter, the residual CFO is referred to as a second residual CFO). In other words, the reception module needs to adjust the residual CFO to have a small value in order to efficiently apply the above-described blind CFO estimation methods. In the following embodiments, first CFO estimation will be described. The total CFO (hereinafter referred to as a third CFO) is obtained by the sum of the first and second residual CFOs. Hereinafter, details of the proposed embodiments will be explained.

First, a reception module estimates the first residual CFO using RSs. Similar to the aforementioned CFO estimation methods 1 and 2, the reception module generates a function $y_k^n$ of Equation 22 using signals received in two consecutive OFDM symbols.

$$y_k^n \triangleq r_k^{n+1}(r_k^n)^*, k \in D_n, n=1, 2, \ldots, L \quad \text{[Equation 22]}$$

Unlike Equations 5 and 12, in Equation 22, k is an element of $D_n$ rather than $C_n$. Here, $D_n$ indicates a set of indices of subcarriers where RSs are located in an $n^{th}$ OFDM symbol. That is, the reception module generates the function $y_k^n$ of Equation 22 using a relationship between REs in which RSs are located and consecutive OFDM symbols. Meanwhile, $C_n$ indicates a set of indices of subcarriers where data is located rather than RSs. Since one RS carries either the RS or data, $\{D \cap C\} = \{\phi\}$ is satisfied.

With reference to Equation 23 together with Equation 22, a process performed by the reception module for estimating the first residual CFO is described $$\Delta \hat{\epsilon}_n^{(1)} = \text{angle}\left(\sum_{n=1}^{L} \sum_{k \in D_n} y_k^n\right) \times \frac{N}{2\pi(N + N_g)} \quad \text{[Equation 23]}$$

In Equation 23, $\Delta \hat{\epsilon}_n^{(1)}$ indicates the first residual CFO measured with respect to the $n^{th}$ OFDM symbol using the RSs. That is, the first residual CFO is measured only with respect to subcarrier $D_n$ where RSs are located.

When the first residual CFO is determined based on Equations 22 and 23, the reception module compensates received data using the first residual CFO. Such a process could be interpreted as a process of changing phases of the received data by the first residual CFO. Since the RSs are known to the reception module in advance, the first residual CFO calculated through Equations 22 and 23 can be used for adjusting the total CFO, which has a large value, to have a sufficiently small value. Even though the first residual CFO is not completely equal to the total CFO, a remaining residual CFO can be decreased to become a sufficiently small value through the data compensation process based on the first residual CFO.

Meanwhile, $y_k^n$ in Equation 23 can be expressed in detail as shown in Equation 24 below.

$$y_k^n \approx |H_k^n|^2 s_k^{n+1}(s_k^n)^* e^{j2\pi\Delta\epsilon_n(N+N_g)/N}$$

$$\rightarrow |H_k^n|^2 \rho e^{j2\pi\Delta\epsilon_n(N+N_g)/N} \quad [\text{Equation 24}]$$

The first equation in Equation 24 is deduced from Equations 8 and 9. Meanwhile, since the RSs are known to the reception module in advance as described above, the reception module already knows phases of $s_k^{n+1}(s_k^n)^*$. Thus, $s_k^{n+1}(s_k^n)^*$ can be eliminated in Equation 24 and then, the second equation in Equation 24 is generated. Since the reception module already knows information on phase values of $s_k^{n+1}(s_k^n)^*$, a process for solving a phase ambiguity problem is not required in Equations 22 and 23.

The process for compensating data after determination of the first residual CFO can be expressed as shown in Equation 25.

$$y_k^n \triangleq r_k^{n+1}(r_k^n)^* \ e^{-j2\pi\Delta\hat{\epsilon}_n^{(1)}(N+N_g)/N}, \ k \in C,$$
$$n=1, 2, \ldots, L \quad [\text{Equation 25}]$$

Equation 25 corresponds to a process of changing a phase of the received signal by the measured first residual CFO ($\Delta\hat{\epsilon}_n^{(1)}$) of Equation 23. After completion of the data compensation process using the first residual CFO, the reception module estimates the second residual CFO ($\Delta\hat{\epsilon}_n^{(2)}$) which corresponds to the remaining portion of the total residual CFO ($\Delta\hat{\epsilon}_n$), using the aforementioned CFO estimation method 1 or 2. When data transmission is performed using the QPSK, a process of estimating the second residual CFO can be expressed as shown in Equation 26.

$$z_k^n = \begin{cases} y_k^n & \text{if real } (y_k^n) \geq 0, \text{real } (y_k^n) \geq \text{imag } (y_k^n) \\ -y_k^n & \text{if real } (y_k^n) < 0, \text{real } (y_k^n) \geq \text{imag } (y_k^n) \\ -j \times y_k^n & \text{if imag } (y_k^n) \geq 0, \text{real } (y_k^n) < \text{imag } (y_k^n) \\ j \times y_k^n & \text{if imag } (y_k^n) < 0, \text{real } (y_k^n) < \text{imag } (y_k^n) \end{cases} \quad [\text{Equation 26}]$$

Equation 26 is equal to Equation 13 and it corresponds to a process of changing phases of the entire data into the in-phase state to estimate a reduced second residual CFO. If the BPSK or QBPSK is used instead of the QPSK, Equation 6 may be used for the same process. Meanwhile, if the BPSK and QBPSK are alternately used for two consecutive OFDM symbols, Equation 11 may be used instead of Equation 25. Alternatively, if the BPSK (or QBPSK) and QPSK are alternately used for two consecutive OFDM symbols, Equation 18 may be used instead of Equation 25.

In addition to Equation 6, Equation 27 is used to estimate the second residual CFO.

$$\Delta\hat{\epsilon}_n^{(2)} = \text{angle}\left(\sum_{n=1}^{L}\sum_{k \in C_n} z_k^n\right) \times \frac{N}{2\pi(N+N_g)} \quad [\text{Equation 27}]$$

In Equation 27, the residual CFO is calculated with respect to $C_n$ unlike Equation 23. That is, the residual CFO is calculated with respect to only the subcarriers where data is present except the subcarriers where RSs are present.

When the second residual CFO is finally calculated according to Equation 27, the total CFO can be obtained by the sum of the first and second CFOs (as shown in Equation 28).

$$\Delta\hat{\epsilon}_n = \Delta\hat{\epsilon}_n^{(1)} + \Delta\hat{\epsilon}_n^{(2)} \quad [\text{Equation 28}]$$

Hereinafter, a description will be given of various embodiments applicable to the above-described series of CFO estimation processes.

According an embodiment of the present invention, while performing the process of estimating the second residual CFO, the reception module can calculate the residual CFO with respect to not only the subcarriers where data is present but also the subcarriers where RSs are present. In other words, the second residual CFO can be calculated through Equation 29 instead of Equation 27.

$$\Delta\hat{\epsilon}_n^{(2)} = \text{angle}\left(\sum_{n=1}^{L}\left(\sum_{k \in C_n} z_k^n + \sum_{k \in D_n} y_k^n e^{-j2\pi\Delta\hat{\epsilon}_n^{(1)}(N+N_g)/N}\right)\right) \times \frac{N}{2\pi(N+N_g)} \quad [\text{Equation 29}]$$

According to this embodiment, the number of samples used for the second residual CFO estimation increases by the number of the subcarriers where RSs are present and thus, performance of the second residual CFO estimation is improved. For example, when the number of data subcarriers is equal to the number of RS subcarriers (|C|=|D|), performance of the second residual CFO estimation based on Equation 29 is improved by 3 dB than that of Equation 27. Further, the second residual CFO is defined in the form of improving accuracy of the first residual CFO estimation, and therefore, performance of the total residual CFO (or third residual CFO) estimation is also improved by 3 dB.

Hereinabove, the description has been made of the case in which the reception module calculates the first residual CFO, compensates data using the calculated first residual CFO, and then calculates the second residual CFO. However, according to an embodiment, the data compensation process and the second residual CFO calculation process can be unified as a single process as shown in Equation 30.

$$\Delta\hat{\epsilon}_n = \text{angle}\left(\sum_{n=1}^{L}\left(\sum_{k \in C_n} z_k^n e^{j2\pi\Delta\hat{\epsilon}_n^{(1)}(N+N_g)/N} \times \sum_{k \in D_n} y_k^n\right)\right) \times \frac{N}{2\pi(N+N_g)} \quad [\text{Equation 30}]$$

Particularly, after the calculation of the first residual CFO, the third residual CFO can be calculated immediately without the data compensation process and the second residual CFO calculation process. To this end, in Equation 30, a phase of a received signal ($Z_k^n$) is changed by the first residual CFO. In addition, according to the present embodiment, both of the data subcarriers and the RS subcarriers are used to calculate the third residual CFO similar to Equation 29. Equation 30 can be expressed as Equation 31 using a mathematical calculation and it can be seen that the total residual CFO calculated through Equation 30 is equal to that calculated through Equations 22 to 28.

$$\Delta \hat{\epsilon}_n = \quad \text{[Equation 31]}$$

$$\Delta \hat{\epsilon}_n^{(1)} + \text{angle}\left(\sum_{n=1}^{L}\left(\sum_{k \in C_n} z_k^n + \sum_{k \in D_n} y_k^n e^{-j2\pi\Delta\hat{\epsilon}_n^{(1)}(N+N_g)/N}\right)\right) \times \frac{N}{2\pi(N+N_g)} = \Delta\hat{\epsilon}_n^{(1)} + \Delta\hat{\epsilon}_n^{(2)}$$

Hereinabove, the CFO estimation methods have been described on the assumption that subcarriers where RSs are located are the same in two consecutive OFDM symbols ($D_n = D_{n+1}$). However, this assumption may not be established depending on how data and RSs are placed in a resource region. For example, there may be a case of $D_n \subset D_{n+1}$ or $D_{n+1} \supset D_n$. In this case, $D_n$ is defined as $\overline{D}_n = \{D_n \cap D_{n+1}\}$ in the proposed embodiment.

That is, the reception module can perform the process of estimating the first residual CFO through RSs only for subcarrier where RSs are present in both $n^{th}$ and $(n+1)^{th}$ OFDM symbols. This is because when the reception module knows a value of either $s_k^n$ and $s_k^{n+1}$, the phase ambiguity problem occurs.

Further, in case the first residual CFO is estimated on the assumption of $\overline{D}_n = \{D_n \cap D_{n+1}\}$, the set of subcarriers where data is present in the $n^{th}$ OFDM symbol, $C_n$ can also be defined as $\overline{C}_n = C_n \cup \{D_n - \{D_n \cap D_{n+1}\}\}$. That is, subcarriers except the subcarriers where RSs are present in both two consecutive OFDM symbols are excluded from the first CFO estimation process, and they are used as samples in the first residual CFO estimation process.

Hereinabove, the CFO estimation method has been described with respect to the subcarriers where RSs are located in both two consecutive OFDM symbols. However, a case in which there are no subcarriers where RSs are located in consecutive OFDM symbols may occur, that is, there may be a case in which $\overline{D}_n = \{\phi\}$. In this case, the aforementioned first residual CFO estimation process can be dropped. In other words, after the first residual CFO ($\Delta\hat{\epsilon}_n^{(1)}$) is set to 0, the remaining processes may be performed.

Meanwhile, the above-proposed first residual CFO estimation process can be applied to OFDM symbols located apart by G. The first residual CFO can be calculated with respect to subcarriers where RSs are present in both $n^{th}$ and $(n+G)^{th}$ OFDM symbols according to Equation 32.

$$y_k^n \triangleq r_k^{n+G}(r_k^n)^*, k \in \overline{D}_{n,G}, n = 1, 2, \ldots, L \quad \text{[Equation 32]}$$

$$\Delta\hat{\epsilon}_n^{(1)} = \text{angle}\left(\sum_{n=1}^{L}\sum_{k \in D_n} y_k^n (s_k^{n+G})^* s_k^n\right) \times \frac{N}{2\pi G(N+N_g)}$$

In Equation 32, $\overline{D}_{n,G} \triangleq \{D_n \cap D_{n+G}\}$ is defined. In other words, the CFO estimation methods have been described above on the assumption that a channel and CFO are not changed in two consecutive OFDM symbols. However, according to Equation 32, the reception module performs CFO estimation on the assumption that a channel and CFO are not changed in (G+1) OFDM symbols. An error $e_k^n$ that occurs in the process can be defined as shown in Equation 33.

$$e_k^n \triangleq |y_k^n - |H_k^n|^2 s_k^{n+G}(s_k^n)^* e^{j2\pi\Delta\epsilon_n(N+N_g)G/N}|^2 \quad \text{[Equation 33]}$$

The error $e_k^n$ increase as the distance G between two OFDM symbols increases. Thus, according to this embodiment, CFO estimation efficiency is improved when the channel and CFO are rarely changed during the (G+1) OFDM symbols in case of $\overline{D}_{n,G} \triangleq \{D_n \cap D_{n+G}\} \neq \{\phi\}$.

Hereinabove, the description has been made of a case in which the CFO is estimated through the same subcarriers in two OFDM symbols (consecutive OFDM symbols or OFDM symbols apart by G). However, according to another embodiment, the CFO can be estimated through adjacent subcarriers rather than the same subcarriers. For example, the first CFO estimation process can be changed as shown in Equation 34.

$$y_k^n \triangleq r_{k+\delta_D}^{n+1}(r_k^n)^*, k \in D_n, n = 1, 2, \ldots, L \quad \text{[Equation 34]}$$

In Equation 34, $\delta_D$ indicates a distance between two subcarriers used for the CFO estimation. When the first residual CFO is calculated based on Equation 34, the second CFO calculation process can be changed as shown in Equation 35.

$$y_k^n \triangleq r_{k+\delta_C}^{n+1}(r_k^n)^* e^{-j2\pi\Delta\hat{\epsilon}_n^{(1)}(N+N_g)/N}, k \in C,$$
$$n = 1, 2, \ldots, L \quad \text{[Equation 35]}$$

In Equation 35, $\delta_C$ indicates a distance between adjacent subcarriers. In Equations 34 and 35, channels between adjacent subcarriers are assumed to be equal with each other ($H_{k+\delta}^{n+1} = H_k^n$). An error $e_k^n$ caused by the above assumption can be defined as similar to that of Equation 33 and expressed as shown in Equation 36.

$$e_k^n \triangleq |y_k^n - |H_k^n|^2 s_k^{n+1}(s_k^n)^* e^{j2\pi\Delta\epsilon_n(N+N_g)/N}|^2 \quad \text{[Equation 36]}$$

where $H_{j+\delta}^{n+1}(H_k^n)^* \approx |H_k^n|^2$

The error $e_k^n$ increases as a difference between $H_k^n$ and $H_{k+\delta}^{n+1}$ increases. Thus, in this embodiment, as selectivity in the frequency domain decreases, the performance increases. For example, in an in-door environment where delay profile of a channel is small, the embodiment can be operated efficiently.

Meanwhile, in Equations 34 and 35, $\delta_C$ and $\delta_D$ may have different values. In addition, if both of the two values are 0, Equations 34 and 35 are equal to Equations 22 and 25, respectively.

According to the third proposed method for the CFO estimation, the reception module estimates the first residual CFO using the RSs which are known to the reception module in advance. The first residual CFO is used in the data compensation process and then the second residual CFO is calculated from the compensated data using the CFO estimation method 1 or 2.

Meanwhile, the process of estimating the first residual CFO using RSs has been described on the assumption that channels of two OFDM symbols are equal to each other. However, in case A of FIG. 28, CRSs are transmitted through different antenna ports in first and second OFDM symbols. That is, since channels of the two OFDM symbols are different from each other, the above-mentioned method cannot be applied. However, in the case of an evolved physical downlink control channel (E-PDCCH) in the LTE/LTE-A, since two OFDM symbols are transmitted in the same antenna port, the proposed CFO estimation method can be applied.

In addition, in third and fourth OFDM symbols of FIG. 28, RSs are not arranged. Thus, the total residual CFO is estimated without the first residual COF estimation process. In the case of fourth and fifth OFDM symbols, since RSs are present only in the fifth OFDM symbol, that is, $\overline{D}_n = \{\phi\}$ is established, the first residual CFO estimation process is also dropped.

In case B (sixth and seventh OFDM symbols) of FIG. 28, the number of RSs is doubled compared to the case A. Thus, in the case B, since the number of samples for the first residual CFO estimation is doubled, the first residual CFO estimation performance is improved by 3 dB compared to the case A.

In case C (ninth and eleventh OFDM symbols), the first residual CFO can be estimated with reference to OFDM symbols apart from each other by G=1 according to Equation 33. However, in the case C, the estimation performance may be degraded compared to the cases A and B According to the aforementioned embodiments, the reception module estimates the first residual CFO using the data known to the reception module in advance, compensates part of the CFO of data (during this process, the phase ambiguity problem does not occur), and then estimates the remaining second residual CFO using the aforementioned blind CFO estimation method. By doing so, the blind CFO estimation method can be applied even when the amount of the residual CFO is small, thereby improving the performance and efficiency of the residual CFO estimation.

Figure 29:
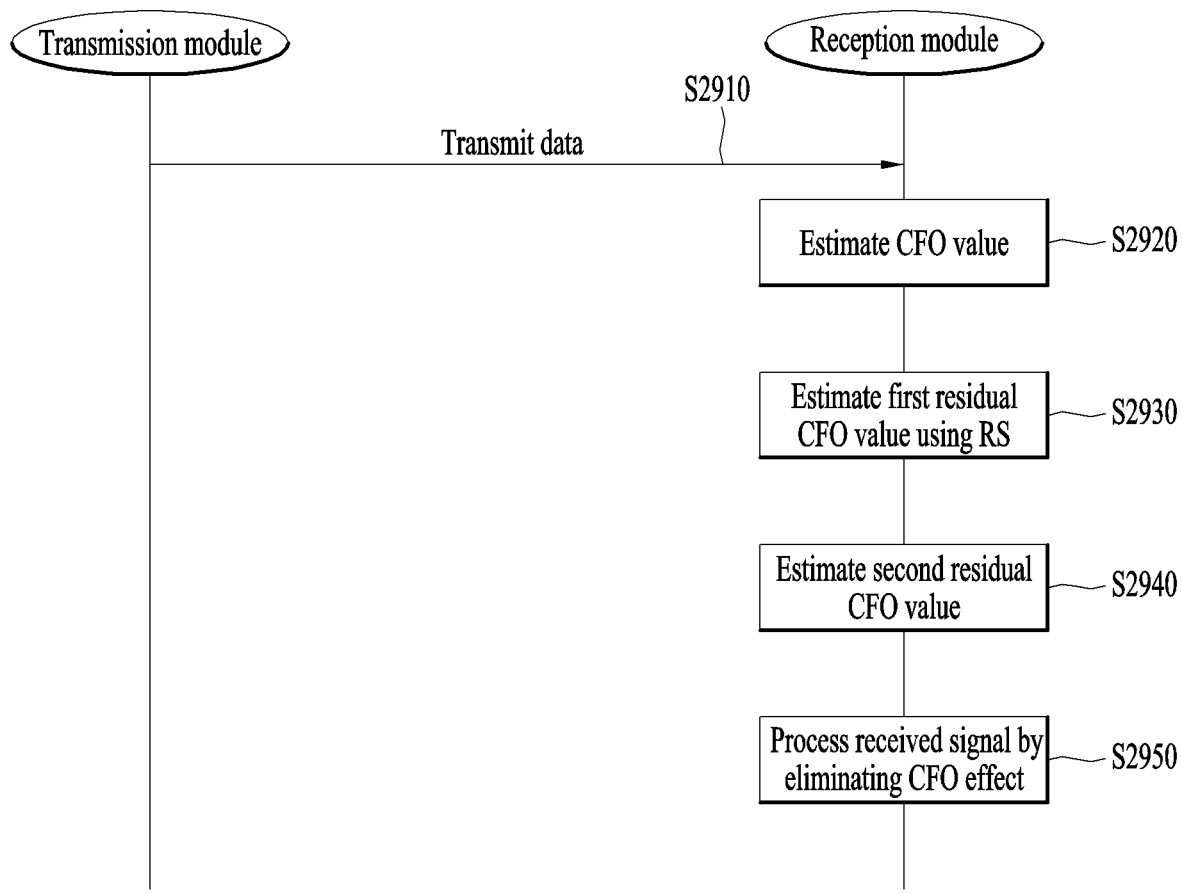
FIG. 29 is a flowchart illustrating a CFO estimation method according to the present invention.

FIG. 29 is a flowchart illustrating a CFO estimation method according to the present invention.

Specifically, FIG. 29 shows a time series flow of the CFO estimation method in accordance with the embodiments described with reference to FIG. 28. Thus, it is apparent that although the embodiments described above with reference to FIG. 28 are not explicitly described in FIG. 29, they can be applied in the same or similar manner First, a transmission module transmits data to a reception module [S2910]. Here, the data can be transmitted on a frame basis, where the frame is defined by an OFDM symbol and a subcarrier. In addition, the data is mapped to a specific constellation and then transmitted to the reception module. The constellation may include BPSK, QBPSK, QPSK, etc. and the BPSK and QBPSK or the BPSK (or QBPSK) and QPSK may be alternately used for a series of consecutive OFDM symbols.

Meanwhile, the reception module primarily estimates a CFO value from received signals [S2920]. Such a process is performed using preamble parts such as L-STF, L-LTF, and the like in the frame. However, since a CFO value is changed depending on time, the CFO value estimated in the step S2920 may not be accurate. thus, the reception module subsequently performs processes for residual CFO estimation.

The reception module estimates a first residual CFO value using RSs [S2930]. Specifically, the reception module estimates the first residual CFO using RSs received in both two consecutive OFDM symbols in a specific subcarrier. The reception module compensates phase values of the data using the estimated first residual CFO and then estimates a second residual CFO with reference to the compensated data [S2940]. Since the data is compensated based on the estimated first residual CFO estimated of the step S2930, the second residual CFO of the step S2940 has a relatively small value. Thus, the reception module estimates the second residual CFO through the step 2330 of FIG. 23 or the step 2730 and the sum of the two residual CFOs estimated in the steps S2930 and S2940 corresponds to a total residual CFO.

Lastly, the reception module eliminates the effect of the CFO estimated in the step S2920 and the total residual CFO estimated in the steps S2930 and S2940 and thus can accurately decode the data transmitted from the transmission module.

6. Fourth Proposed Method for CFO Estimation

Hereinabove, the embodiments in which the reception module calculates the residual CFO using received signals according to the CFO estimation methods 1, 2 and 3 have been described. However, since it is assumed in the above-described embodiments that data transmission is performed using BPSK, QBPSK, QPSK modulation schemes, the embodiments cannot be applied to 16-quardrature amplitude modulation (QAM), which is a high-order modulation scheme. The reason for this is that the aforementioned blind CFO estimation methods have a prerequisite that a phase difference between signals received in two consecutive OFDM symbols with respect to a specific subcarrier should converge to a specific value. However, when the 16-QAM or other higher-order modulation schemes are used, the prerequisite cannot be satisfied.

Thus, a method performed by a reviver for CFO estimation when data transmission is performed using a high order modulation scheme (e.g., 16-QAM) will be described hereinafter with reference to FIGS. 30 to 32.

First, a pair of received signals means signals received in two consecutive OFDM symbols as described above in the above-proposed embodiments. In Equation 5, C means a subcarrier index set of entire received signal pairs and the aforementioned CFO estimation performance is proportional to a size of the set C, |C|. That is, as the number of samples (received signal pairs) applied to a CFO estimation algorithm increases, the estimation performance is improved. As described above, when data transmission is performed using the BPSK, QBPSK, and QPSK, all the received signal pairs are used for the CFO estimation.

Meanwhile, when the CFO estimation method is applied to high-order QAM (e.g., 16-QAM), some of all the received signal pairs can be used as samples. Considering this fact, Equation 5 can be expressed as Equation 37.

$$y_k^n \triangleq r_k^{n+1} (r_k^n)^*, k \in \overline{C}, n=1, 2, \ldots, L \qquad \text{[Equation 37]}$$

where $\overline{C} \subset C$

In Equation 37, $\overline{C}$ indicates a subset selected from the set of all the received signal pairs, C according to the following embodiment. Specifically, according to the proposed embodiment, it is possible to maximize the performance by increasing the number of samples for the CFO estimation through a method for selecting received signal pairs to maximize a size of $\overline{C}$.

Figure 30:
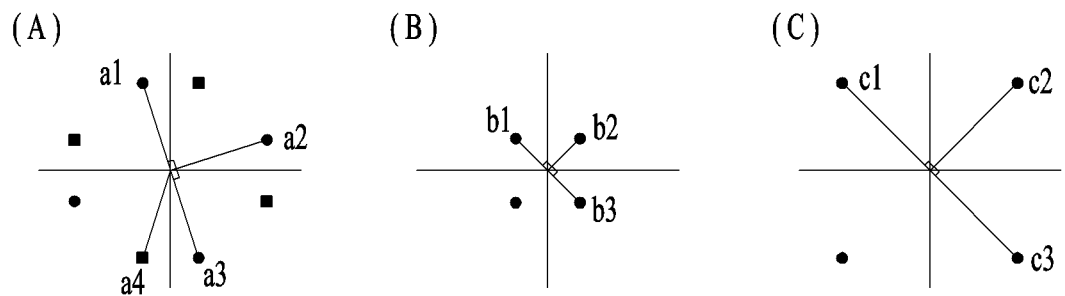
FIGS. 30 and 31 are diagrams illustrating a method for dividing a 16-QAM constellation according to the present invention.
Figure 31:
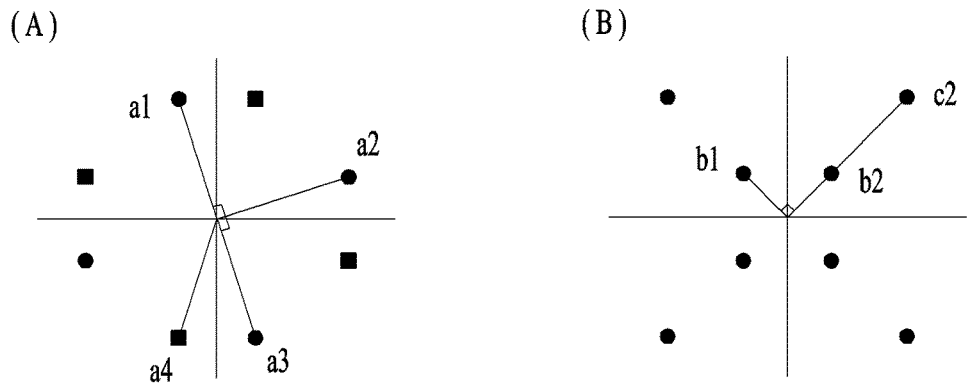

FIGS. 30 and 31 are diagrams illustrating a method for dividing a 16-QAM constellation according to the present invention. As shown in FIGS. 30 and 31, some of points placed in a 16-QAM constellation match points placed in a QPSK constellation. Thus, if signals in two OFDM symbols are mapped to points in the 16-QAM constellation, which correspond to the points in the QPSK constellation, and then transmitted, the aforementioned CFO estimation methods 1, 2, and 3 can be applied as it is. Based on the above discussion, a CFO estimation method using a size and phase of the received signal pair will be described.

According to the proposed embodiment, a reception module first determines received signal pairs to be used for residual CFO estimation processes by comparing sizes of received signal pairs. While comparing the sizes of the received signal pairs, the reception module can calculate either a ratio of sizes or a size difference. Equation 38 corresponds to a process of calculating a ratio of sizes of a received signal pair and Equation 39 corresponds to a process of calculating a difference between sizes of a received signal pair.

$$\gamma_k^n \triangleq \frac{|r_k^{n+1}|}{|r_k^n|} \text{ or } \left|\frac{r_k^{n+1}}{r_k^n}\right| \quad \text{[Equation 38]}$$

$$\kappa_k^n \triangleq |r_k^{n+1}| - |r_k^n| \text{ or } |r_k^{n+1} - r_k^n| \quad \text{[Equation 39]}$$

In Equations 38 and 39, $r_k^n$ indicates a signal received in an $n^{th}$ OFDM symbol, and k indicates an index of a subcarrier where $n^{th}$ and $(n+1)^{th}$ OFDM symbols are located. In Equations 38 and 39, $(r_k^n, r_k^{n+1})$ means a received signal pair.

Meanwhile, considering that channels of the $n^{th}$ and $(n+1)^{th}$ OFDM symbols are equal to each other in the same subcarrier and there is no CFO and no noise, Equation 38 can be expressed as Equation 40 below.

$$\gamma_k^n \triangleq \frac{|r_k^{n+1}|}{|r_k^n|} = \frac{|H_k^n s_k^{n+1}|}{|H_k^n s_k^n|} = \frac{|H_k^n||s_k^{n+1}|}{|H_k^n||s_k^n|} = \frac{|s_k^{n+1}|}{|s_k^n|} \quad \text{[Equation 40]}$$

That is, since the channels of the two OFDM symbols are equal, the ratio of the sizes of the received signal pair received by the reception module is represented with a ratio of sizes of data symbols $s_k^n$, $s_k^{n+1}$ transmitted from the transmission module. If the data symbols transmitted from the transmission module are equal to each other, the ratio of sizes of the received signal pair $\gamma_k^n$ becomes 1.

As described above, FIG. 30 shows an embodiment of dividing the 16-QAM constellation into three portions. That is, the 16-QAM constellation can be obtained by combining the three portions (A), (B), and (c) show in FIG. 30. Specifically, the three portions (A), (B), and (C) of FIG. 30 are created by grouping data symbols with the same power in the 16-QAM. Thus, it can be seen that when the ratio of the sizes of the received signal pair received by the reception module $\gamma_k^n$ is 1, two data symbols constituting the received signal pair are included in any one of (A), (B), and (C) of FIG. 30.

For example, when the ratio of the sizes of the received signal pair is 1, the two data symbols may be any one of (a1, a2), (a1, a4), (b1, b2), and (c1, c3) but cannot be (a1, b1), or (b1, c1). In conclusion, the reception module can find out the received signal pair corresponding to the two data symbols with the same power using the ratio of the sizes of the received signal pair without using channel information (i.e., in a non-coherent manner).

Meanwhile, in FIG. 30, (B) and (C) have the same arrangement as that of the QPSK constellation. Thus, if it is determined that both of a pair of received signals simultaneously exist in either (B) or (C), the reception module can estimate the residual CFO using the aforementioned CFO estimation method 2.

On the other hand, the received signal pair can be included in (A) and in the (A) group, two types of phase differences are present between data symbols. First, in the (A) group, a phase difference between points indicated by the same marker (square or circle) may be one of $\{0, \pi/2, \pi, 3\pi/2\}$. In addition, a phase difference between points represented by different markers is one of $\{46°, 136°, 226°, 316°\}$.

In the first case (points indicated by the same marker), since phase differences between symbols are equal to those of the QPSK similar to the cases (B) and (C), the CFO estimation method 2 can be applied in a similar manner (hereinafter, this case is referred to as case (A-1)). However, in the second case (points indicated by different markers), since phase differences between received signals are different from each other, the aforementioned CFO estimation methods cannot be applied (hereinafter, this case is referred to as case (A-2)). In the cases (A-1), (B), and (C), the reception module can directly estimate the residual CFO through the CFO estimation method 2. However, in the case (A-2), the reception module can perform the same processing as that in the case (A-1) by changing phases of received signals by −46°. Thus, the reception module should distinguish between the cases (A-1) and (A-2) and details will be described later.

FIG. 31 illustrates another embodiment of dividing the 16-QAM constellation into two portions. Similar to FIG. 30, the 16-QAM can be obtained by combining the two portions (A) and (B) shown in FIG. 31. If a ratio of sizes of a received signal pair is 1/3 or 3, one of two data symbols selected by the transmission module is three times greater than the other one. In this case, the data symbols of the received signal pair simultaneously belong to (B) of FIG. 31 and here, (B) of FIG. 30 is obtained by combining (B) and (C) of FIG. 30. When the ratio of the sizes of the received signal pair is 1/3 or 3, the reception module can estimate the CFO using the CFO estimation method 2 in a similar manner In other words, if the CFO estimation method 2 is applied to the case in which the received signal pair size ratio is 1/3 or 3, the number of samples used for the CFO estimation increases (that is, the size of $\overline{C}$ increase) compared to the case in which the size ratio is 1, whereby the CFO estimation performance can be enhanced. For example, if received signals when the size ratio is 1/3 or 3 are used as samples for the CFO estimation method, the reception module can perform the CFO estimation using received signal pairs (b1, c2), and (b2, c2) shown in FIG. 31(B) (however, the received signal pair (a1, b1) cannot be used as a CFO estimation candidate).

In conclusion, when a ratio of sizes of a received signal pair is within a predetermined range, the reception module can use the corresponding received signal pair in the course of the CFO estimation. According to an embodiment, a received signal pair can be selected with reference to a size difference between the received signal pair instead of a ratio of sizes of the received signal pair.

Although theoretically the reception module should determine whether the ratio of the sizes of the received signal pair is equal to a specific value, channels of the received signal pair is not precisely identical to each other in terms of implementation of the actual system. Moreover, the effects of noise and CFO are always present. Thus, the proposed embodiment is rarely applied only when the ratio of the sizes of the actually received signal pair is equal to the specific value. In other words, when the ratio has a value within a predetermined range so that the ratio is considered to be sufficiently close to the corresponding value, the proposed embodiment can be applied. That is, if a ratio of sizes of a received signal pair satisfies the condition in Equation 41, the corresponding received signal pair can be used in the CFO estimation processes.

$$1-\delta \leq \gamma_k^n \leq 1+\delta \text{ or } 3-\delta \leq \gamma_k^n \leq 3+\delta \quad \text{[Equation 41]}$$

In Equation 41, $\delta$ indicates a threshold ranges of the ratio of the sizes of the received signal pair, and for example, $\delta$ may be set to 0.1.

Hereinafter, an embodiment of distinguishing between the cases (A-1) and (A-2) will be additionally described. As described above with reference to FIG. 30, the cases (B) and (C) in which the ratio of the sizes of the received signal pair is 1 can be used as a sample for the CFO estimation method 2. The case (A-1) can also be used as a sample for the CFO estimation method 2 but the case (A-2) requires a process of changing phases of received signals. Therefore, a description will be given of a method of distinguishing the case (A-2).

According to the proposed embodiment, the reception module can determine whether to use a received signal pair as a sample for the CFO estimation method by considering a phase difference between the received signal pair. Before describing the details, it is first mentioned that phases of the received signal pair received by the reception module can be replaced with phases of data symbols transmitted by the transmission module for the purpose of calculation. In the aforementioned CFO estimation method 2, a phase of $y_k^n$ indicates a phase of the product of the received signal pairs received by the reception module and it is identical to that of the product of the data symbols transmitted by the transmission module. This is because phases of channels are cancelled out when the received signal pair is multiplied with each other. In other words, it can be seen that the phases of the channels which the received signals go through do not affect the phases of the product of the received signal pair. Hence, there is no problem even though the phase of the product of the received signal pair is replaced with the phase of the product of the data symbols transmitted from the transmission module regardless of the channels of the received signals.

Meanwhile, the reception module first checks whether the received signal pair satisfies Equation 41 to distinguish the case (A-2) of FIG. 30. When it is determined that the received signal pair satisfies Equation 41, the reception module checks whether a phase difference $\lambda_k^n$ of the received signal pair satisfies Equation 42.

$$\alpha-\delta \leq \lambda_k^n \leq \alpha+\delta \quad \text{[Equation 42]}$$

where $\lambda_k^n = \measuredangle (r_k^{n-1} (r_k^n)^*)$

In Equation 42, α is one of {0°, 90°, 180°, 270°} (i.e., α∈{0°, 90°, 180°, 270°}) and δ indicates a predetermined threshold range. For example, in case of α=90° and δ=10°, Equation 42 can be expressed as 80°≤$\lambda_k^n$≤100°. When Equation 42 is satisfied, the received can know that the corresponding received signal pair belongs to one of the cases (A-1), (B), and (C) and then determine the corresponding received signal pair as the sample to be used in the residual CFO estimation processes. On the other hand, when Equation 42 is not satisfied, the reception module can know that the corresponding received signal pair belongs to the case (A-2). In this case, the reception module does not use the corresponding received signal pair for the CFO estimation. Meanwhile, candidate values of α are not limited to the above-mentioned examples, 0°, 90°, 180°, and 270° and can include other values close to 0°, 90°, 180°, and 270°.

As described above, in the case (A-2) of FIG. 30, the phase difference between the received signal pair may be one of {46°, 136°, 226°, 316°}. Thus, when it is determined that the phase difference between the received signal pair is close to the specific value, the corresponding signal pair can be used for the CFO estimation using simple additional processing.

According to the proposed embodiment, when it is determined that α∈{0°, 90°, 180°, 270°} and α∈{46°, 136°, 226°, 316°} and the phase difference $\lambda_k^n$ corresponds to α∈{46°, 136°, 226°, 316°} in Equation 42, the reception module can change the phase of the product of the received signal pair by $$e^{-j\frac{46°}{180°}\pi}$$

according to Equation 43. In this case, 46°, 136°, 226°, and 316° are merely exemplary and other values close to 46°, 136°, 226°, and 316° can also be used.

$$y_k^n = r_k^{n+1}(r_k^n)^* e^{-j\frac{46°}{180°}\pi} \quad \text{[Equation 43]}$$

According to Equation 43, the changed phase difference of the received signal pair is one of {0°, 90°, 180°, 270°}. That is, the phase difference changed based on Equation 43 is similar to that of the case (A-1) and thus, the received signal pair can be used for the CFO estimation. That is, if the phase of the product of the received signal pair is changed as described above, the number of received signal pairs that can be used in the CFO estimation processes is increased, thereby improving the CFO estimation performance due to the increased $\overline{C}$.

According to the aforementioned embodiments, the reception module calculates the size ratio (or difference) of the received signal pair to determine whether to use the received signal pair for the CFO estimation. Table 2 shows that $|\overline{C}|$ is changed depending on how the reception module operates the proposed embodiments. Specifically, Table 2 shows a probability value of $|\overline{C}|/|C|$ in each case.

TABLE 2

| Ratio of sizes of received signal pair | Compensation of phase difference between received signal pair (whether phase chance embodiment is applied) | $p\left(\frac{|\overline{C}|}{|C|}\right)$ |
| --- | --- | --- |
| $\gamma_{k=1}^n$ | X | 1/4 |
| $\gamma_{k=1}^n$ | O | 3/8 |
| $\gamma_{k=1 \text{ or } 3}^n$ | X | 3/8 |
| $\gamma_{k=1 \text{ or } 3}^n$ | O | 1/2 |

In Table 2, when $\gamma_k^n$ is equal to 1 and the phase change embodiment is not applied, the cases (A-1), (B) and (C) are used as the sample for the CFO estimation method. In this case, probability that two data symbols corresponding to the received signal pair simultaneously belong to either the case (B) or (C) is (1/4)*(1/4)=(1/16). Probability that the two data symbols corresponding to the received signal pair simultaneously belong to only the case (A) is (1/2)*(1/2)=(1/4). In this case, only the case (A-1) is handled, probability that the two data symbols corresponding to the received signal pair simultaneously belong to only the case (A-1) is 1/8. Eventually, the value of $$p\left(\frac{|\overline{C}|}{|C|}\right)$$

indicating a ratio of received signal pairs to be used for the CFO estimation method to all the received signal pairs is (1/16)+(1/16)+(1/8)=(1/4).

Similarly, when $\gamma_k^n$ is 1 and the phase change embodiment is applied, the cases (A-1), (A-2), (B), and (C) are used as the sample of the CFO estimation method. In this case, the value of $$p\left(\frac{|C|}{|C|}\right)$$

is (1/16)+(1/16)+(1/4)=(3/8).

In addition, when k is 1 or 3 and the phase change embodiment is not applied, the cases (A-1) of FIG. 30 and the case (B) of FIG. 31 can be used for the CFO estimation method. In this case, probability that the two data symbols corresponding to the received signal pair simultaneously belong to the case (B) of FIG. 31 is (1/2)*(1/2)=(1/4) and in this case, the probability that two data symbols belong to the case (A-1) is 1/8 as described above. Therefore, the value of $$p\left(\frac{|C|}{|C|}\right)$$

is (1/4)+(1/8)=(3/8).

Lastly, when $\gamma_k''$ is 1 or 3 and the phase change embodiment is applied, all of the cases (A-1) and (A-2) of FIG. 30 and the case (B) of FIG. 31 are used for the CFO estimation method. Therefore, the value of $$p\left(\frac{|C|}{|C|}\right)$$

becomes (1/4)+(1/4)=(1/2).

In other words, the reception module calculates the size ratio and phase difference of the received signal pair and then compare them with predetermined values in order to determine whether the received signal pair can be used for the CFO estimation method. In this case, as the number of received signal pairs used for the CFO estimation method increases, the CFO estimation performance is improved. Thus, the reception module can utilize up to half of received signal pairs in the 16-QAM for the CFO estimation. Meanwhile, the threshold for the allowable size ratio and the use of the phase difference compensation can be determined by a user or system. For example, when the channel state is not sufficiently good, the reception module can operate in the situation that the size ratio is set to 1 and the phase difference compensation is not applied. In other words, the number of received signal pairs used for the CFO estimation method can be adaptively changed depending on the communication environment.

Hereinabove, the description has been given of the embodiment of applying the blind CFO estimation method used for the BPSK, QBPSK, and QPSK to the divided 16-QAM has been described. However, the 16-QAM is merely an example for convenience of description and the proposed method can be applied to various modulation schemes such as 32, 64, 128, 256 QAM, etc. in a similar manner.

Figure 32:
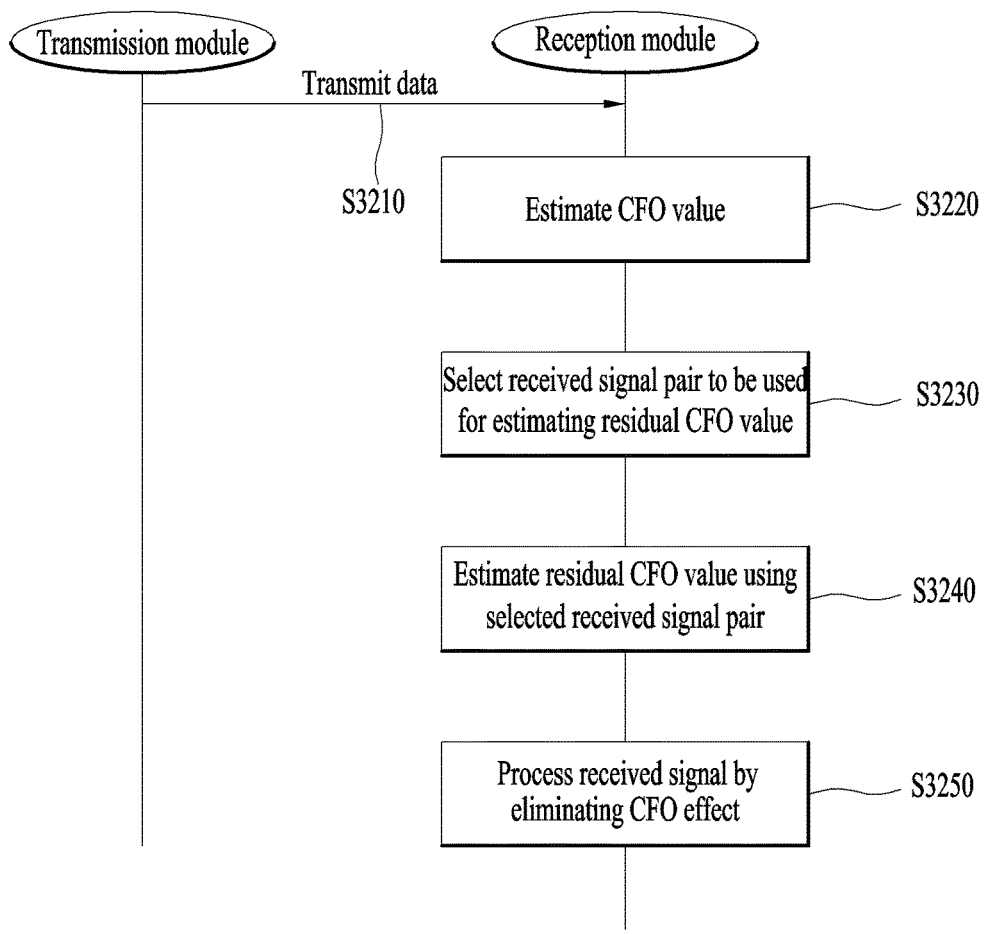
FIG. 32 is a flowchart illustrating a CFO estimation method according to the present invention.

FIG. 32 is a flowchart illustrating a CFO estimation method according to the present invention. Specifically, FIG. 32 shows a time series flow of the CFO estimation method in accordance with the embodiments described with reference to FIGS. 30 and 31. Thus, although the features described above with reference to FIGS. 30 and 31 are not described in FIG. 32, the features can be applied to the flowchart of FIG. 32 in the same or similar manner.

First, a transmission module transmits data to a reception module [S3210]. Here, the data can be transmitted on a frame basis, where the frame is defined by an OFDM symbol and a subcarrier. In addition, the data is mapped to a specific constellation and then transmitted to the reception module. Although the constellation may include various high-order QAM such as 16, 32, 64, 128, 256 QAM, etc., a description will be made by taking the 16-QAM as an example.

The reception module primarily estimates a CFO value from received signals [S3220]. Such a process is performed using preamble parts such as L-STF, L-LTF, and the like in the frame. However, since a CFO value is changed depending on time, the CFO value estimated in the step S3220 may not be accurate. Thus, the reception module subsequently performs processes for residual CFO estimation.

First, the reception module selects a received signal pair to be used in estimating residual CFO value [S3230]. The reception module can perform such selection through a process of calculating a ratio of sizes of a received signal pair. Alternatively, the reception module can perform it through a process of calculating not only the ratio of the sizes of the received signal pair but also a phase difference between the received signal pair. If the calculated size ratio and/or phase difference has a specific value or is included in a threshold range close to the corresponding specific value, the receive may determine that the received signal pair is to be used for the residual CFO estimation. That is, in the step S3230, the reception module selects received signal pairs to be used as samples in the residual CFO estimation processes.

Thereafter, the reception module estimates the residual CFO value using the selected received signal pairs [S3240]. Such a process can be performed based on the CFO estimation method 2 described with reference to FIGS. 24 to 26. In other words, the reception module analyzes some of received signal pairs received through the 16-QAM based on the QPSK and estimates the residual CFO by utilizing the residual CFO estimation method applied to the QPSK modulation scheme.

Lastly, the reception module eliminates the effect of the CFO estimated from the received signals and the residual CFO and thus can accurately decode the data transmitted from the transmission module.

7. Proposed Doppler Measurement Method

First, the Doppler effect will be described in brief. The CFO may occur due to the Doppler effect and performance of an oscillator as described above (in Equation 44). In this case, the Doppler effect means a change in signal phase due to lapse of time and a moving speed of the reception module, and the magnitude of the Doppler effect increases as a frequency band increases. Meanwhile, the Doppler effect can be represented by a change in frequency of a signal received by the reception module.

$$\epsilon_k = k\beta + \epsilon \quad \text{[Equation 44]}$$

$$\text{where } \epsilon \triangleq \frac{f_0^T - f_0^R + \beta f_0^T}{\Delta f}, \beta = \frac{v}{c}\cos\theta$$

In Equation 44, $\epsilon_k$ indicates the CFO of a $k^{th}$ subcarrier and $f_0^T$, $f_0^R$, and $\Delta f$ indicate a transmission module oscillator frequency, a reception module oscillator frequency, and a subcarrier spacing, respectively. In addition, V and C indicate a user equipment's speed and the light speed, respectively. Moreover, θ indicates an angle between a moving direction of the reception module and an incidence direction of the received signal. In this case, the received signal is received through a plurality of rays due to the impact of a cluster and θ has a different value in each ray. Thus, $\in_k$ also has a different value in each ray. However, in mmWave communication using ultra-high frequency band, there is a dominant ray due to propagation characteristics. In the following description, the Doppler effect will be explained on the assumption of a single dominant ray. Under the above-described situation, the CFO of the $k^{th}$ subcarrier can be expressed as shown in Equation 44.

In the aforementioned CFO estimation methods, when the total CFO is estimated, $\in$ is calculated without consideration of a component kβ due to the Doppler effect. In this case, all subcarriers are assumed to have the same CFO irrespective of differences between subcarrier indices. This may be valid in the case of a low-speed UE or small bandwidth. However, in the case of a high-speed UE or large bandwidth, the component kβ cannot be neglected and the above assumption may cause an error in the CFO estimation.

Equation 45 below shows a signal received in an OFDM symbol obtained by considering the Doppler effect (β) and a frequency difference ($f_0^T - f_0^R$) between the oscillators of the transmission/reception modules.

$$Fg = F(D(\epsilon)F_\beta^H Hs + w) \quad \text{[Equation 45]}$$
$$= CHs + Fw$$

where $$g \triangleq D(\epsilon)F_\beta^H Hs + w$$
$$C \triangleq FD(\epsilon)F_\beta^H$$

In Equation 45, g indicates a time-domain received signal and F indicates a DFT matrix. H is a diagonal matrix and a diagonal element of the matrix H indicate a channel gain in the frequency domain. S means transmission data transmitted from the transmission module. $F_\beta^H$ is defined as shown in Equation 46.

$$[F_\beta^H]_{n,k} = \frac{1}{N} e^{j2\pi nk(1+\beta)/N} \quad \text{[Equation 46]}$$

Before describing the details of Equation 46, a matrix C indicating inter-carrier interference is defined first. That is, when $\in$ and β are present, the matrix C indicates how a signal on a specific subcarrier affects other subcarriers as a leakage signal and the matrix C is referred to as an inter-carrier interference matrix.

If there is no Doppler effect (β=0), $F_{\beta=0}^H$ in Equation 46 becomes IDFT ($F^H$). Meanwhile, elements or entries of the inter-carrier interference matrix C are expressed in the closed form as shown in Equation 47.

$$[C]_{mn} = \sum_{l=0}^{N-1} e^{j2\pi(-m+n+n\beta+\epsilon)l/N} \quad \text{[Equation 47]}$$
$$= e^{j\pi\theta(N-1)/N} \frac{\sin(\pi\theta)}{\sin(\pi\theta/N)}$$

where $\theta = -m+n+n\beta+\epsilon$

In Equation 47, in case of β=0 and $f_0^T - f_0^R = 0$, the inter-carrier interference matrix C becomes an identity matrix. Equation 48 below shows a signal received on an $m^{th}$ subcarrier can be deduced from Equation 47.

$$[C]_{mn} = e^{j\pi(m\beta+\epsilon)(N-1)/N} \frac{\sin(\pi(m\beta+\epsilon))}{\sin(\pi(m\beta+\epsilon)/N)} H_m s_m + I_m + w'_m \quad \text{[Equation 48]}$$

In Equation 48, $I_m$ indicates a leakage signal from a different subcarrier to the $m^{th}$ subcarrier and $w_m$ trindicates noise. It can be checked from Equation 48 that a phase and amplitude of $H_m s_m$ is changed by the CFO. Particularly, it can be seen that as mβ+$\in$ decreases, the amplitude of $H_m s_m$ decreases within a range of |mβ+$\in$|≤1. In conclusion, as the CFO value and m increase, the reception SINR decreases.

Thus, if the reception module knows the Doppler effect (β) and the CFO ($\in$) due to the oscillator, the CFO can be compensated according to Equation 49.

$$F_\beta^{-1} D(-\epsilon)g = F_\beta^{-1} D(-\epsilon)(D(\epsilon)F_\beta^H Hs + w) \quad \text{[Equation 49]}$$
$$= Hs + w'$$

where $w' \triangleq F_\beta^{-1} D(-\epsilon) w$

In Equation 49, D(-$\in$) can primarily eliminate the CFO by linearly changing a phase of the received signal in the time domain. Thereafter, the reception module secondarily eliminates the CFO using $F_\beta^{-1}$ instead of F. Eventually, the CFO is completely eliminated from the received signal and thus, the reception SINR at the reception module can also be improved.

Based on the above discussion, a description will be given of a Doppler measurement method with reference to the proposed embodiment. According to the aforementioned blind CFO estimation methods 1 and 2, when the residual CFO is small, it is possible to improve the CFO estimation performance with low-complexity implementation. However, for the blind CFO estimation methods, it should be premised that all subcarriers have the same CFO ($\in_k = \in$). However, when a UE moves with a high speed, such a prerequisite may decrease the reception SINR. Equation 50 is devised to reflect such a situation.

$$Fg = F(D(\epsilon)F_\beta^H Hs + w) \quad \text{[Equation 50]}$$
$$= CHs + Fw$$

where $$g \triangleq D(\epsilon)F_\beta^H Hs + w$$
$$C \triangleq FD(\epsilon)F_\beta^H$$

In Equation 50, the CFO of the $k^{th}$ subcarrier is defined as $\in_k = k\beta + \in$. Thus, all the subcarriers have different CFOs and as a large value of |k| means a high CFO value. In addition, the Doppler effect β is defined as $$\beta = \frac{v}{c} \cos\theta$$

and thus, it can be seen that as the UE's speed increases, the Doppler effect increases. Meanwhile, when the UE's moving speed is zero (v=0), β also becomes zero and all the subcarriers have the same CFO value. The present invention proposes not only a method of measuring the impact of the Doppler effect in a blind manner but also a method of eliminating the impact of the Doppler effect from a received signal with low-complexity implementation.

According to a proposed embodiment, the reception module generates a function shown in Equation 51 by multiplying received signals on adjacent subcarriers with respect to a specific OFDM symbol.

$$\tilde{y}_k^n \triangleq r_{k+1}^n (r_k^n)^*, k \in C_n, n=1, 2, \ldots, L \quad \text{[Equation 51]}$$

It can be seen in Equation 51 that the product of received signals on $k^{th}$ and $(k+1)^{th}$ subframes is defined unlike Equation 5. A function $\tilde{y}_k^n$ defined in Equation 51 can reflect correlation between received signals. Next, the reception module performs a process of changing a phase of the function $\tilde{y}_k^n$ in the in-phase state according to Equation 52.

$$z_k^n = \begin{cases} \tilde{y}_k^n & \text{if real } (\tilde{y}_k^n) \geq 0, \text{real } (\tilde{y}_k^n) \geq \text{imag } (\tilde{y}_k^n) \\ -\tilde{y}_k^n & \text{if real } (\tilde{y}_k^n) < 0, \text{real } (\tilde{y}_k^n) \geq \text{imag } (\tilde{y}_k^n) \\ -j \times \tilde{y}_k^n & \text{if imag } (\tilde{y}_k^n) \geq 0, \text{real } (\tilde{y}_k^n) < \text{imag } (\tilde{y}_k^n) \\ j \times \tilde{y}_k^n & \text{if imag } (\tilde{y}_k^n) < 0, \text{real } (\tilde{y}_k^n) < \text{imag } (\tilde{y}_k^n) \end{cases} \quad \text{[Equation 52]}$$

Lastly, when a function $Z_k^n$ for changing the received signals in the in-phase state is performed on all the OFDM symbols and subcarriers, a Doppler value is finally measured based on Equation 53.

$$\beta = \angle \left( \sum_{n=1}^{L} \sum_{k \in C_n} z_k^n \right) \times \frac{N}{\pi(N-1)} \quad \text{[Equation 53]}$$

The symbols (or components) in Equations 51 to 53 are the same as those defined in the aforementioned embodiments.

Meanwhile, a frequency-domain received signal $r_n$ in the $n^{th}$ OFDM symbol can be defined as shown in Equation 54.

$$r_n = Fg_n \quad \text{[Equation 54]}$$

In Equation 54, $g_n$ indicates a time-domain received signal in the $n^{th}$ OFDM symbol. It can be seen from Equation 54 that $r_k^n$ indicates a received signal on the $k^{th}$ subcarrier among frequency-domain received signals $r_n$.

Meanwhile, Equation 52 is applied when data transmission is performed using the QPSK. On the other hand, when the BPSK or QBPSK is used, Equation 6 for the aforementioned CFO estimation method 1 can be used instead of Equation 52. In addition, when the BPSK and QBPSK are alternately used for consecutive OFDM symbols, Equation 11 can be applied instead of Equation 51.

Hereinafter, details of Equations 51 to 53 will be described. According to the proposed Doppler measurement method, the Doppler effect value ($\beta$) is measured using a phase difference between adjacent subcarriers with respect to the same OFDM symbol. First, a received signal on the $k^{th}$ subcarrier can be expressed as shown in Equation 55.

$$r_k = \alpha_{\epsilon_k} H_k s_k + I_k + w_k \quad \text{[Equation 55]}$$

where $\epsilon_k \triangleq k\beta + \epsilon$ $$\alpha_{\epsilon_k} \triangleq e^{j\pi\epsilon_k(N-1)/N} \frac{\sin(\pi\epsilon_k)}{\sin(\pi\epsilon_k/N)}$$

In Equation 55, $\epsilon_k$ indicates the CFO of the $k^{th}$ subcarrier and it is defined as $\epsilon_k = k\beta + \epsilon$. In this case, the CFO due to the oscillator, $\epsilon$ has the same value with respect to all the subcarriers and it is referred to as a common CFO.

If the impact of noise and interference in Equation 55 is neglected, Equation 51 can be approximated as shown in Equation 56.

$$\tilde{y}_k^n \approx \alpha_{\epsilon_k}^* \alpha_{\epsilon_{k+1}} (H_k^n)^* H_{k+1}^n (s_k^n)^* s_{k+1}^n \quad \text{[Equation 56]}$$

$$\approx \tilde{D}_k^n L((s_k^n)^* s_{k+1}^n) e^{j\pi\beta(N-1)/N}$$

where $\tilde{D}_k^n \triangleq \left( \frac{\sin(\pi\epsilon_k)}{\sin(\pi\epsilon_k/N)} \right)^2 |H_k^n|^2 \rho$ In Equation 56, the approximation of the first equation to the second equation is based on the assumption that adjacent subcarriers with respect to the same OFDM symbol have the same channel. It can be seen in Equation 56 that the phase of $\tilde{y}_k^n$ is determined by a phase difference between data of two received signals and the Doppler effect ($\beta$).

In Equation 52, the phase ambiguity problem is solved in a blind manner similar to the CFO estimation methods 1 and 2. That is, Equation 52 allows functions $\tilde{y}_k^n$ to have a specific phase. Next, the reception module finally measures the Doppler value from the functions in the in-phase state according to Equation 53.

According to an embodiment, the reception module may estimate the common CFO in a blind manner as described in the CFO estimation methods 1 and 2 and then apply the Doppler measurement method described in Equations 51 to 53 to signals obtained by eliminating the common CFO.

Particularly, when the noise and interference can be neglected, $y_k^n$ can be approximated as shown in Equation 57 based on the received signal modeling described in Equations 54 to 56.

$$y_k^n \triangleq r_k^{n+1} (r_k^n)^* \quad \text{[Equation 57]}$$

$$\approx \alpha_{\epsilon_k}^* \alpha_{\epsilon_k} (H_k^n)^* H_k^{n+1} (s_k^n)^* s_k^{n+1} e^{j2\pi\epsilon(N+1)/N}$$

$$\approx D_k^n L((s_k^n)^* s_k^{n+1}) e^{j2\pi\epsilon(N+1)/N}$$

where $D_k^n \triangleq |\alpha_{\epsilon_k}|^2 |H_k^n|^2 \rho$

In Equation 57, the approximation of the first equation to the second equation is based on the assumption that the same subcarriers with respect to adjacent OFDM symbols have the same channel. Equation 57 means that even though the total CFO is defined as $\epsilon_k \triangleq k\beta + \epsilon$, the phase of $y_k^n$ can be expressed as $\angle((s_k^n)^* s_k^{n+1}) e^{j2\pi\epsilon(N+1)/N}$. Thus, the aforementioned blind CFO estimation method can be applied without any changes in estimating the common CFO ($\epsilon$).

The reception module generates a primary signal by eliminating the common CFO, which is estimated through the aforementioned CFO estimation method 1, 2 (or 3), from the received signal in the time domain. That is, there is no effect of the CFO in the primary signal. Next, the reception module can measure the Doppler value according to the embodiments described with reference to Equations 51 to 53. Equation 58 corresponds to a process of generating the primary signal by eliminating the effect of the common CFO.

$$g_n^{(1)} = D(-\hat{\epsilon})g_n \quad \text{[Equation 58]}$$
$$= D(\Delta\epsilon)F_\beta^H H s + w'$$
where $w' \triangleq D(-\hat{\epsilon})w, \Delta\epsilon \triangleq \epsilon - \hat{\epsilon}$ In Equation 58, $g_n^{(1)}$ indicates a primary signal in which the common CFO ($\epsilon$) is eliminated and in this process, a filter $D(-\hat{\epsilon})$ is used. $D(\Delta\epsilon)$ indicates the effect of the residual CFO.

Meanwhile, a desired signal of $r_k$, which is mentioned in Equations 54 to 56 can be expressed as shown in Equation 59.

$$r_{k,desired\ signal} = \alpha_{\epsilon_k} H_k s_k \quad \text{[Equation 59]}$$
$$= e^{j\pi\epsilon_k(N-1)/N}\frac{\sin(\pi\epsilon_k)}{\sin(\pi\epsilon_k/N)}H_k s_k$$

Equation 59 means that the magnitude of the desired signal is determined by a value of $$\left|\frac{\sin(\pi\epsilon_k)}{\sin(\pi\epsilon_k/N)}\right|.$$

In addition, as $|\epsilon_k|$ increases, the value of $$\left|\frac{\sin(\pi\epsilon_k)}{\sin(\pi\epsilon_k/N)}\right|$$

decreases within a range of $|\epsilon_k| \leq 1$. In this case, when the common CFO is present, the magnitude of the desired signal is significantly decreased due to $\epsilon_k = \epsilon + k\beta$. In addition, the magnitude of an interference signal $I_k$ increases as $|\epsilon_k|$ increases. Moreover, since the SINR of the received signal increases as the magnitude of the common CFO, $|\epsilon|$ decreases, the performance of the total Doppler estimation process is improved.

In summary, according to the proposed embodiment, the common CFO value estimated in a blind manner is eliminated from the received signal (i.e., the primary signal is generated ($g_n^{(1)} = D(-\hat{\epsilon})g_n$)) and then, the Doppler value is measured from the primary signal through a process of comparing phases of adjacent subcarriers ($r_n^{(1)} = F g_n^{(1)}$).

Hereinafter, an embodiment for eliminating the effect of the measured Doppler value will be described. That is, the reception module measures the Doppler value from the primary signal and the measured Doppler value needs to be eliminated from the reception module signal. In this specification, a signal in which the effect of the Doppler value is eliminated from the first signal is referred to as a secondary signal.

According to an embodiment, the reception module creates a block-diagonal form of an interference matrix using the measured Doppler value (in a similar manner as described in Equations 46 to 48) and then generates a secondary signal by applying the interference matrix to the primary signal according to Equation 10.

$$r_n^{(2)} = R_{prop}g_n \quad \text{[Equation 60]}$$
where
$$R_{prop} \triangleq \tilde{C}^{-1}F_\beta$$
$$\tilde{C} \triangleq \begin{bmatrix} C_1 & 0 & \cdots & 0 \\ 0 & C_2 & \ddots & \vdots \\ \vdots & \ddots & \ddots & 0 \\ 0 & \cdots & 0 & C_G \end{bmatrix}$$
$$C_i \triangleq C[(i-1)\times P+1: iP, (i-1)\times P+1: iP]$$
$$w'' \triangleq R_{prop}D(-\hat{\epsilon})w$$

First, the interference matrix C is defined as $C \triangleq F_\beta F_\beta^H + \sigma_W^2 I_N$. Entries of the interference matrix C can be expressed in the close form as shown in Equation 61.

$$[C]_{mn} \triangleq e^{j\pi\theta(N-1)/N}\frac{\sin(\pi\theta)}{\sin(\pi\theta/N)} + \sigma_w^2\delta_{m-n} \quad \text{[Equation 61]}$$
where $\theta \triangleq -m+n+n\beta+\epsilon$
$$\delta_{m-n} \triangleq \begin{cases} 1 & \text{for } m=n \\ 0 & \text{otherwise} \end{cases}$$

Meanwhile, the secondary signal ($y_2$) corresponds to a result obtained by eliminating the effect of the common CFO and the Doppler effect on the frequency axis. In Equation 60, $R_{prop}$ is a filter used for generating the secondary signal and is generated from the interference matrix C. In the proposed embodiment, a block-diagonal matrix $\tilde{C}$ of the interference matrix C is used instead of the interference matrix C due to the implementation complexity. Each block element $C_i$ of $\tilde{C}$ is defined as a sub-matrix of C and its size is defined as P. Thus, the total G of block matrices $\{C_1, C_2, \ldots, C_G\}$ are defined and the equation of $P*G=N$ is satisfied.

Particularly, if the reception module is aware of the Doppler value $\beta$, the reception module can perform the CFO compensation according to Equation 62.

$$y_2 = R_{conv}y_1 \quad \text{[Equation 62]}$$
where $R_{conv} \triangleq (F_\beta F_\beta^H + \sigma_W^2 I_N)^{-1} F_\beta$ However, the process in accordance with Equation 62 requires an N*N level of inverse matrix operation and moreover, when N is large, it may cause a serious complexity issue. For example, considering that N is 2048 in the LTE system, it is difficult to compute the N*N level of inverse matrix operation.

To overcome such a complexity issue, $R_{prop}$ is used instead of $R_{conv}$. That is, $\tilde{C}$ of $R_{prop}$ corresponds to the approximate form of C. That is, the block-diagonal matrix $\tilde{C}$ is created by setting some off-diagonal terms (elements) of C to 0. In this case, the inverse matrix operation may be replaced with inverse matrix operation of each block term (element) and thus, the complexity is decreased from $O(N^3)$ to $O(GP^3)$. In addition, if P is set to 3 or 4, such a complexity level can be decreased so that the system can be implemented. For example, in case of P=4, the complexity in accordance with the proposed method can be significantly decreased so that it is only 0.0004% of that when $R_{conv}$ is used.

The above approximation is based on the assumption that off-diagonal terms far away from the diagonal terms are small. The off-diagonal term physically means the amount of leakage of a signal on a single subcarrier to other subcarriers. In this case, as a subcarrier is close to the subcarrier where the signal leakage occurs, the impact of the leakage increases. On the other hand, as a subcarrier is far away from the subcarrier where the signal leakage occurs, the impact of the leakage decreases. In conclusion, as $|\langle m-n \rangle_N|$ of $[C]_{mn}$ increases, the impact of the leakage decreases. Based on this result, it is possible to minimize not only the complexity but also performance degradation by performing the approximation, i.e., by replacing the off-diagonal terms far away from the diagonal terms with 0.

For example, if P is equal to N, the equation of $R_{prop}=R_{conv}$ is satisfied due to $\tilde{C}=C$. On the contrary, if P is 1, all off-diagonal terms can be neglected and thus, the complexity is minimized. However, in this case, the performance may be significantly degraded. Therefore, the value of P should be determined such that a trade-off between the complexity and performance degradation can be properly adjusted.

In order to determine the value of P as described above, the reception module may consider the magnitude of the Doppler value β and the maximum allowable complexity. As described above, the complexity and performance is determined according to the value of P. Meanwhile, since the magnitudes of the off-diagonal terms decrease as the magnitude of the Doppler value β decreases, the performance degradation is not large even though the value of P is set to be small.

For example, when a UE's moving speed is low, the reception module can use a small value of P. On the contrary, when a UE's moving speed is high, the reception module can use a large value of P. In this case, the maximum value of P is limited in consideration of the maximum allowable complexity of a UE.

Equation 60 corresponds to a general process of eliminating a Doppler value. However, the primary signal where the effect of the common CFO is eliminated as described above may be expressed as $g_n^{(1)}=D(-\hat{\in})g_n$. Thus, entries of C where the effect of the common CFO is eliminated can be modified as shown in Equation 63.

$$[C]_{mn} \triangleq e^{j\pi\theta(N-1)/N} \frac{\sin(\pi\theta)}{\sin(\pi\theta/N)} + \sigma_w^2 \delta_{m-n} \quad \text{[Equation 63]}$$

where $\theta \triangleq -m+n+n\beta$

Comparing Equation 63 with Equation 60, it can be seen in Equation 63 that the component $\in$ is eliminated from θ.

In the proposed embodiment, a method of measuring a Doppler value and compensating the measured Doppler value when each subcarrier has a different CFO value due to the Doppler effect is described. According to the proposed method, the reception module estimates the CFO in a blind manner, eliminates the estimated CFO, measure a Doppler value, and generates the final signal by compensating the measured Doppler value.

Figure 33:
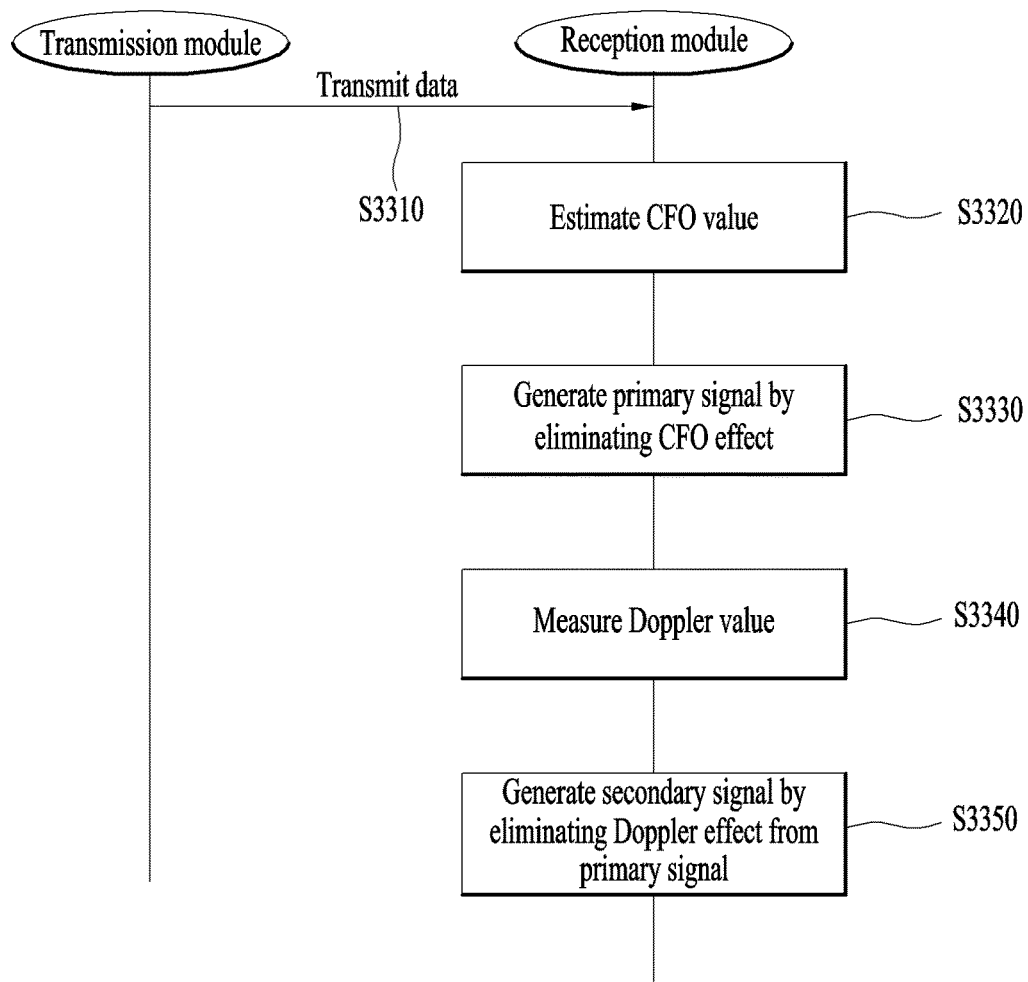
FIG. 33 is a flowchart illustrating a Doppler measurement method according to a proposed embodiment.

FIG. 33 is a flowchart illustrating a Doppler measurement method according to a proposed embodiment. Specifically, FIG. 33 shows a time series flow of the aforementioned embodiments. Thus, although the above-mentioned features are not described in FIG. 33, the features can be applied to the flowchart of FIG. 33 in the same or similar manner.

First, a transmission module transmits data to a reception module [S3310]. Here, the data can be transmitted on a frame basis, where the frame is defined by an OFDM symbol and a subcarrier. In addition, the data is mapped to a specific constellation and then transmitted to the reception module. In this case, the constellation may include not only the BPSK, QBPSK, and QPSK but also various high-order QAM such as the 16, 32, 64, 128, 256 QAM, etc.

The reception module primarily estimates a CFO value from a received signal [S3320]. Such a process can be performed using a CFO estimation method where preamble parts are used and a residual CFO estimation method performed in a blind manner. The CFO estimation methods using various modulation schemes are described above with reference to FIGS. 17 to 32 and these CFO estimation methods can be used in the step S3320.

The total CFO estimated in the step S3320 corresponds to a common CFO. The reception module generates a primary signal by eliminating (compensating) the effect of the common CFO from the received signal [S3330]. Although the CFO effect is removed in the primary signal, the impact of the Doppler effect still remains.

The reception module measures a Doppler value from the primary signal (S3340). In the step 3340, the embodiments in accordance with the aforementioned Doppler measurement method are applied. For example, the reception module can measure the Doppler value by multiplying signals received on different subcarriers with respect to the same OFDM symbol.

After measuring the Doppler value, the reception module generates a secondary signal by eliminating the Doppler effect from the primary signal [S3350]. There are no impacts of the common CFO and Doppler effect in the secondary signal. The reception module can process the data transmitted from the transmission module by decoding the secondary signal.

8. Apparatus Configuration

Figure 34:
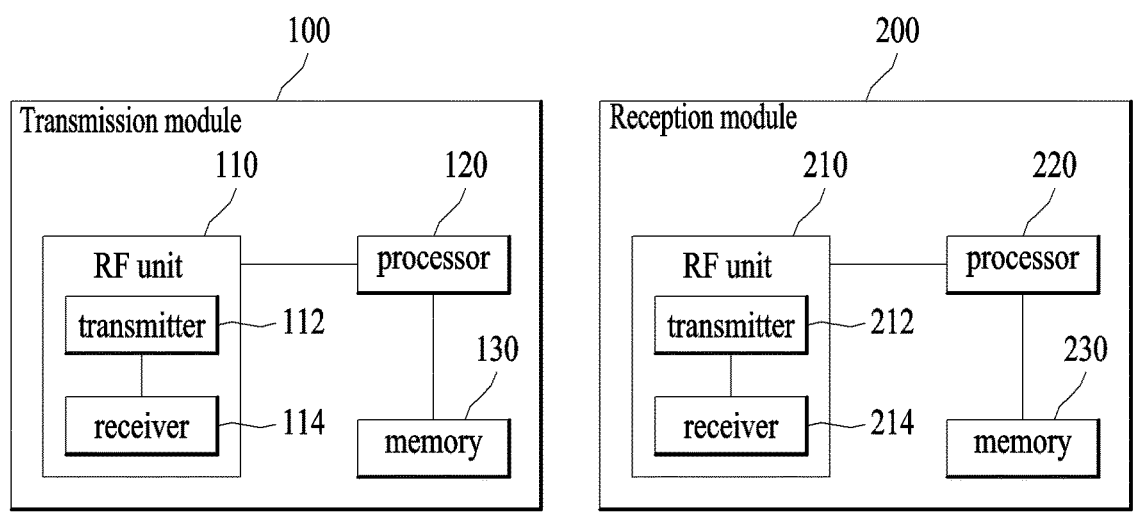
FIG. 34 is a block diagram illustrating configurations of a user equipment and a base station according to an embodiment of the present invention.

FIG. 34 is a block diagram showing the configuration of a reception module and a transmission module according to one embodiment of the present invention. In FIG. 34, the reception module 100 and the transmission module 200 may include radio frequency (RF) units 110 and 210, processors 120 and 220 and memories 130 and 230, respectively. Although a 1:1 communication environment between the reception module 100 and the transmission module 200 is shown in FIG. 34, a communication environment may be established between a plurality of reception module and the transmission module. In addition, the transmission module 200 shown in FIG. 34 is applicable to a macro cell base station and a small cell base station.

The RF units 110 and 210 may include transmitters 112 and 212 and receivers 114 and 214, respectively. The transmitter 112 and the receiver 114 of the reception module 100 are configured to transmit and receive signals to and from the transmission module 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the reception module 100 may perform the methods of the various embodiments of the present invention.

The transmitter 212 and the receiver 214 of the transmission module 200 are configured to transmit and receive signals to and from another transmission module and reception modules and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the transmission module 200 may perform the methods of the various embodiments of the present invention.

The processors 120 and 220 of the reception module 100 and the transmission module 200 instruct (for example, control, adjust, or manage) the operations of the reception module 100 and the transmission module 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the CFO estimation method is mainly described based on an IEEE 802.11 system and an HEW system, the method can be applied to various kinds of wireless communication systems as well as the IEEE 802.11 system and the HEW system.

What is claimed is:

1. A Doppler measurement method for a reception module in a wireless communication system, the method comprising:
generating a first function defined by signals received on two consecutive subcarriers for a specific orthogonal frequency division multiplexing (OFDM) symbol;
generating a second function defined based on signs and magnitudes of real and imaginary parts of the first function;
repeatedly performing a process for generating the first and second functions for an entire set of OFDM symbols;
determining a phase of a third function generated by adding results of the repetition as a Doppler value; and
eliminating an effect of the Doppler value from data received from a transmission module,
wherein eliminating the effect of the Doppler value from the data received from the transmission module comprises eliminating the effect of the Doppler value using an interference matrix that indicates interference between subcarriers for data from which a carrier frequency offset (CFO) effect is eliminated.

2. The method of claim 1, further comprising:
before generating the first function, estimating the CFO from the data received from the transmission module in a blind manner; and
generating a candidate signal, where the Doppler value will be measured, by eliminating an effect of the estimated CFO from the data.

3. The method of claim 2, further comprising eliminating a Doppler effect by compensating the Doppler value measured with respect to the candidate signal in a frequency domain.

4. The method of claim 1, wherein the first function is defined according to the following equation:

$$\tilde{y}_k^n \triangleq r_{k+1}^n (r_k^n)^* \qquad \text{[Equation]}$$

where n indicates an OFDM symbol index, k indicates a subcarrier index, $\tilde{y}_k^n$ indicates the first function, and $r_k^n$ indicates the received signal(s).

5. The method of claim 1, wherein the second function is defined according to the following equation:

$$z_k^n = \begin{cases} \tilde{y}_k^n & \text{if real }(\tilde{y}_k^n) \geq 0, \text{real }(\tilde{y}_k^n) \geq imag\ (\tilde{y}_k^n) \\ -\tilde{y}_k^n & \text{if real }(\tilde{y}_k^n) < 0, \text{real }(\tilde{y}_k^n) \geq imag\ (\tilde{y}_k^n) \\ -j \times \tilde{y}_k^n & \text{if imag }(\tilde{y}_k^n) \geq 0, \text{real }(\tilde{y}_k^n) < imag\ (\tilde{y}_k^n) \\ j \times \tilde{y}_k^n & \text{if imag }(\tilde{y}_k^n) < 0, \text{real }(\tilde{y}_k^n) < imag\ (\tilde{y}_k^n) \end{cases} \quad \text{[Equation]}$$

where $\tilde{y}_k^n$ indicates the first function, $Z_k^n$ indicates the second function, real($\tilde{y}_k^n$) indicates the real part of the first function, and imag($\tilde{y}_k^n$) indicates the imaginary part of the first function.

6. The method of claim 1, wherein the third function is defined according to the following equation:

$$\beta = \angle \left( \sum_{n=1}^{L} \sum_{k \in C_n} z_k^n \right) \times \frac{N}{\pi(N-1)} \qquad \text{[Equation]}$$

where β indicates the Doppler value, n indicates an OFDM symbol index, L indicates a number of total OFDM symbols, k indicates a subcarrier index, C indicates a set of all subcarriers, $Z_k^n$ indicates the second function, and N indicates an OFDM symbol length.

7. The method of claim 1, wherein eliminating the effect of the Doppler value from the data received from the transmission module comprises eliminating the impact of the Doppler value using an approximated interference matrix, which is a block diagonal form of the interference matrix.

8. The method of claim 7, wherein sizes of block elements of the approximated interference matrix are determined based on at least one of the Doppler value and maximum complexity of the reception module.

9. A reception module for Doppler measurement in a wireless communication system, the reception module comprising:
a transmitter;
a receiver; and
a processor operatively connected to the transmitter and the receiver,
wherein the processor is configured to:
generate a first function defined by signals received on two consecutive subcarriers for a specific orthogonal frequency division multiplexing (OFDM) symbol;
generate a second function defined based on signs and magnitudes of real and imaginary parts of the first function;
repeatedly perform a process for generating the first and second functions for an entire set of OFDM symbols;
determine a phase of a third function generated by adding results of the repetition as a Doppler value; and
eliminate an effect of the Doppler value from data received from a transmission module and eliminate the effect of the Doppler value using an interference matrix that indicates interference between subcarriers for data from which a carrier frequency offset (CFO) effect is eliminated.

10. The reception module of claim 9, wherein the processor is further configured to estimate the CFO from the data received from the transmission module in a blind manner before generating the first function and generate a candidate signal, where the Doppler value will be measured, by eliminating an effect of the estimated CFO from the data.

11. The reception module of claim 10, wherein the processor is configured to eliminate a Doppler effect by compensating the Doppler value measured with respect to the candidate signal in a frequency domain.

12. The reception module of claim 9, wherein the first function is defined according to the following equation:

$$\tilde{y}_k^n \triangleq r_{k+1}^n (r_k^n)^* \qquad \text{[Equation]}$$

where n indicates an OFDM symbol index, k indicates a subcarrier index, $\tilde{y}_k^n$ indicates the first function, and $r_k^n$ indicates the received signal(s).

13. The reception module of claim 9, wherein the second function is defined according to the following equation:

$$z_k^n = \begin{cases} \tilde{y}_k^n & \text{if real } (\tilde{y}_k^n) \geq 0, \text{real } (\tilde{y}_k^n) \geq imag\ (\tilde{y}_k^n) \\ -\tilde{y}_k^n & \text{if real } (\tilde{y}_k^n) < 0, \text{real } (\tilde{y}_k^n) \geq imag\ (\tilde{y}_k^n) \\ -j \times \tilde{y}_k^n & \text{if imag } (\tilde{y}_k^n) \geq 0, \text{real } (\tilde{y}_k^n) < imag\ (\tilde{y}_k^n) \\ j \times \tilde{y}_k^n & \text{if imag } (\tilde{y}_k^n) < 0, \text{real } (\tilde{y}_k^n) < imag\ (\tilde{y}_k^n) \end{cases} \qquad \text{[Equation]}$$

where $\tilde{y}_k^n$ indicates the first function, $Z_k^n$ indicates the second function, real($\tilde{y}_k^n$) indicates the real part of the first function, and imag($\tilde{y}_k^n$) indicates the imaginary part of the first function.

14. The reception module of claim 9, wherein the third function is defined according to the following equation:

$$\beta = \angle \left( \sum_{n=1}^{L} \sum_{k \in C_n} z_k^n \right) \times \frac{N}{\pi(N-1)} \qquad \text{[Equation]}$$

where β indicates the Doppler value, n indicates an OFDM symbol index, L indicates a number of total OFDM symbols, k indicates a subcarrier index, C indicates a set of all subcarriers, $Z_k^n$ indicates the second function, and N indicates an OFDM symbol length.

15. The reception module of claim 9, wherein the processor is configured to eliminate the effect of the Doppler value using an approximated interference matrix, which is a block diagonal form of the interference matrix.

16. The reception module of claim 15, wherein sizes of block elements of the approximated interference matrix are determined based on at least one of the Doppler value and maximum complexity of the reception module.

* * * * *